US007055093B2

(12) United States Patent
Tozawa et al.

(10) Patent No.: US 7,055,093 B2
(45) Date of Patent: May 30, 2006

(54) GENERATING AUTOMATA FOR VALIDATING XML DOCUMENTS, AND VALIDATING XML DOCUMENTS

(75) Inventors: Akihiko Tozawa, Tokyo-to (JP); Makoto Murata, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 579 days.

(21) Appl. No.: 10/219,614

(22) Filed: Aug. 15, 2002

(65) Prior Publication Data
US 2003/0154444 A1   Aug. 14, 2003

(30) Foreign Application Priority Data
Sep. 11, 2001  (JP) ............................. 2001-275494

(51) Int. Cl.
*G06K 9/36* (2006.01)

(52) U.S. Cl. ...................................... 715/513; 707/201

(58) Field of Classification Search ................ 715/513; 704/7
See application file for complete search history.

(56) References Cited

U.S. PATENT DOCUMENTS 5,915,259 A * 6/1999 Murata ....................... 715/513
6,745,161 B1 * 6/2004 Arnold et al. .................. 704/7

OTHER PUBLICATIONS

Murata Makoto, DTD Transformation by Patterns and Contextual Conditions, 1997, pp. 1-16.*
Murata Makoto, Forest -regular Languages and Tree-regular Languages, 1995.*

* cited by examiner

Primary Examiner—William Bashore
Assistant Examiner—Gautam Sain
(74) Attorney, Agent, or Firm—Stephen C Kaufman

(57) ABSTRACT

Provides method and systems to simplify processing and improve processing speed for validation of an XML document. In an example embodiment, a non-deterministic automaton is generated by a binary tree automaton generation module from a document type definition described by hedge grammar. Furthermore, a deterministic binary tree automaton is generated by a determination module, and a deterministic binary tree automaton of which transition function δ is minimized by a minimization module is generated. This minimum deterministic binary tree automaton is used to validate an XML document with a validation module. When the XML document is normally accepted by the binary tree automaton, validation results wherein the XML document is reasonable are outputted.

22 Claims, 13 Drawing Sheets

GENERATING AUTOMATA FOR VALIDATING XML DOCUMENTS, AND VALIDATING XML DOCUMENTS

CROSS REFERENCES

The present application is related to the following application even dated herewith: application Ser. No. 10/219,620, entitled, "SCHEMA GENERATION APPARATUS, DATA PROCESSORS, AND PROGRAM FOR PROCESSING IN THE SAME DATA PROCESSORS," having common inventors and priority, which is incorporated herein by reference in entirety for all purposes.

FIELD OF THE INVENTION

The present invention relates to generating automata for validating XML documents, and for validating the XML documents.

BACKGROUND ART

XML (extensible markup language) is receiving attention as means capable of general-purpose data exchange. The XML can provide document type definitions (DTD) XML schema or RELAX, etc., where an XML document matching with the document type definition is referred to as a valid XML. The valid XML is different from a well-formed XML which is merely grammatically well-formed, and its validity is assured including: a sequence of elements, whether or not the element is omissible; repetitions of the element, whether or not a hierarchical relationship of the elements is correct; and so on. It is possible, by handling such an XML document of which validity is assured, to render design, development and so on of applications easier so as to implement the data exchange of higher reliability.

Validation of the XML document is implemented by XML document analysis software (validator) called an XML parser or an XML processor. An overview of processing by a general validator is as follows. First, the document type definition is inputted to the validator. A table in compliance with the content model of the document type definition is generated for each element. Each of these tables is constituted to show a character string automaton for representing each content model of the document type definition, that is, a sibling relationship of the elements. Furthermore, a tree automaton for showing a rule of parentage of the elements is prepared. Next, the XML document to be validated is inputted to the validator. The above described table for each model and tree automaton are used so that the tree automaton reads execution results of each character string automaton and operates to validate the XML document.

The document type definition is illustrated by a case of the DTD. If a tag name appearing in the DTD is σ, a character string automaton $M_\sigma$ corresponding to σ is represented by a tuple of five components represented by $M_\sigma = <\Sigma_\sigma, Q_\sigma, \delta_\sigma, I_\sigma, F_\sigma>$. Here, $\Sigma_\sigma$ is a set (alphabet) comprised of all the element types σ' which can emerge as children of the element type σ. $Q_\sigma$ is a state set based on a state q. $\delta_\sigma$ is a table representing a transitional relationship determined by σ' on which $\Sigma_\sigma$ is based and the state q, and it prescribes a transition from a combination of (σ', $q_1$) to a state $q_2$. $I_\sigma$ is an initial state set, and $F_\sigma$ is a set of final states. It will be concretely described by taking the following sample DTD as an example.

(Sample DTD)
<!ELEMENT title (#PCDATA)>
<!ELEMENT para (#PCDATA)>
<!ELEMENT doc (title, section+)>
<!ELEMENT section (title, (section+|para))>

The character string automaton $M_{doc}$ has the content model of an element doc represented by a tuple of five components of $<\Sigma_{doc}, Q_{doc}, \delta_{doc}, I_{doc}, F_{doc}>$. However, an alphabet $\Sigma_{doc}=\{title, section\}$, a state set $Q_{doc}=\{0, 1, 2\}$, an initial state set $I_{doc}=\{0\}$, and a set of final states $F_{doc}=\{2\}$. In addition, a transitional relationship table $\delta_{doc}$ is shown as table 1.

TABLE 1

| | Title | section |
|---|---|---|
| $0^I$ | 1 | — |
| 1 | — | 2 |
| $2^F$ | — | 2 |

To be more specific, validity analysis on a row of child elements of the doc element is started from a state 0, and it is verified whether it finally reaches a state 2 while referring to a corresponding tag name in Table 1 and tracking the state thereof. It is valid if it reaches the final state.

Likewise, the character string automaton $M_{section}$ has the content model of the element doc represented by a tuple of five components of $<\Sigma_{section}, Q_{section}, \delta_{section}, I_{section}, F_{section}>$. However, an alphabet $\Sigma_{section}=\{title, section, para\}$, a state set $Q_{section}=\{0, 1, 2, 3\}$, an initial state set $I_{section}=\{0\}$, a set of final states $F_{section}=\{2, 3\}$. In addition, a transitional relationship table $\delta_{section}$ is shown as Table 2.

TABLE 2

| | Title | section | para |
|---|---|---|---|
| $0^I$ | 1 | — | — |
| 1 | — | 2 | 3 |
| $2^F$ | — | 2 | — |
| $3^F$ | — | — | — |

As for $M_{title}$, and $M_{para}$, $Q=I=F\{0\}$ and $\Sigma=\{\}$ (empty set). A transitional relationship table δ is empty as shown by Table 3.

TABLE 3

| $0^I$ |
|---|

Thus, the automaton $M_\sigma$ is prepared for each element (tag name) σ. And a pushdown memory (stack) and an element reader are prepared so as to validate the XML document according to the following procedure 1. FIG. 13 is a flowchart showing procedure 1.

(Procedure 1)
In a starting step of the procedure, the stack is an empty stack [ ]. First, the tag σ is read (step 201). It is determined whether the read tag σ is an open tag or a closed tag (step 202), and the head of the stack $s_o$ is read if it is the open tag (step 203). It is determined whether $s_o$ is empty (step 204), and ($M_\sigma$, $I_\sigma$) is stacked on the stack if it is empty (step 205), and it returns to the step 201. If the stack is not empty in the step 204, it is assumed to be the read head of the stack $s_o=(M_{\sigma'}, q)$ here as shown in a step 206. A table $\delta_{\sigma'}$ of the element σ' is examined (step 207), and it is determined whether there is the transition (step 208). If there is the transition (here, q transitions to q' as shown in a step 209), the head of the stack $s_o$ is replaced with $s_o=(M_o, q')$ (step 210). Thereafter, $(M_o, I_o)$ is stacked on the stack (step 205), and it returns to the step 201. If there is the transition in the step 208, the validation is a failure (step 211).

If it is determined that the read σ in the step 202 is the closed tag, the head of the stack $s_o$ is read (step 212). It is the read head of the stack $s_o=(M_o, q)$ here as shown in a step 213. It is assumed to be determined whether q is included in $F_{94}$ (step 214), and the validation is a failure if it is not included therein (step 215). If it is determined to be included in step 214, the head of the stack $s_o=(M_o, q)$ is deleted (step 216). Thereafter, it is determined whether the XML document has ended (step 217), and it returns to the step 201 if it has not ended. The processing is finished if it has ended.

The above steps of the validation will be described in detail by taking the following XML document as an example.

---

(XML document)

<doc>
  <title></title>
  <section>
    <title></title>
    <para></para>
  </section>
</doc>

--- i) Read an open tag <doc>. Stack the automaton $Md_{doc}$ and its initial state 0 in the stack. The stack is $[(M_{doc}, 0)]$.

ii) Read an open tag <title>. Examine a table $\delta_{doc}$ by (title, 0). The state of $Md_{doc}$ transitions from 0 to 1 $((M_{doc}, 0)$ at the head of the stack changes to $(M_{doc}, 1))$. Stack the automaton $M_{title}$ and its initial state 0 on the stack. The stack becomes $[(M_{title}, 0), (M_{doc}, 1)]$.

iii) Read a closed tag </title>. As the state 0 of $M_{title}$ is the final state, it is accepted. $(M_{title}, 0)$ is deleted from the stack. The stack becomes $[(M_{doc}, 1)]$.

iv) Read an open tag <section>. Examine the table $\delta_{doc}$ by (section, 1). The state of $M_{doc}$ transitions from 1 to 2 $((M_{doc}, 1)$ at the head of the stack changes to $(M_{doc}, 2))$. Stack the automaton $M_{section}$ and its initial state 0 on the stack. The stack becomes $[(M_{section}, 0), (M_{doc}, 2)]$.

v) Read the open tag <title>. Examine the table $\delta_{section}$ by (title, 0). The state of the automaton $M_{section}$ transitions from 0 to 1 $((M_{section}, 0)$ at the head of the stack changes to $(M_{section}, 1))$. Stack the automaton $M_{title}$ and its initial state 0 on the stack. The stack becomes $[(M_{title}, 0) (M_{section}, 1), (M_{doc}, 2)]$.

vi) Read the closed tag </title>. As the state 0 of $M_{title}$ is the final state, it is accepted. $(M_{title}, 0)$ is deleted from the stack. The stack becomes $[(M_{section}, 1) (M_{doc}, 2)]$.

vii) Read an open tag <para>. Examine the table $\delta_{section}$ by (para, 1). The state of $M_{section}$ transitions from 1 to 3 $((M_{section}, 1)$ at the head of the stack changes to $(M_{section}, 3))$. Stack the automaton $M_{para}$ and its initial state 0 on the stack. The stack becomes $[(M_{para}, 0) (M_{section}, 3), (M_{doc}, 2)]$.

viii) Read a closed tag </para>. As the state 0 of $M_{para}$ is the final state, it is accepted. $(M_{para}, 0)$ is deleted from the stack. The stack becomes $[(M_{section}, 3) (M_{doc}, 2)]$.

ix) Read a closed tag </section>. As the state 3 of $M_{section}$ is the final state, it is accepted. $(M_{section}, 3)$ is deleted from the stack. The stack becomes $[(M_{doc}, 2)]$.

x) Read a closed tag </doc>. As the state 2 of $M_{doc}$ is the final state, it is accepted.

As described above, it is verified that an XML document 1 satisfies the content model of the sample DTD.

Moreover, as the content model of the DTD is corresponding to a tree language of a so-called local class, the automaton M of each content model corresponds to the tag name σ. In the case of the document type definition having a single type constraint such as the XML schema, however, an automaton $M_x$ of each content model does not correspond to the tag name σ. For this reason, in the case of applying the document type definition corresponding to a language class wider than DTD such as the XML schema or the RELAX, it requires an algorithm more complicated than the aforementioned validation of the DTD. For instance, in the case of the XML schema, it is necessary to calculate a table η for acquiring, from a parent content model X and the tag name σ of a child, a content model Y of the child. If the table η is acquired, the above described procedure 1 is expanded as follows. To be more specific, the tag name σ is stored in the above described stack in addition to the automaton M and the state q. The content model Y is acquired by using the table η from the tag name σ read in the step 201 and a content model x corresponding to the automaton $M_x$ currently at the head of the stack. And a table $\delta_x$ is examined by (Y, q) so as to obtain a transition state q'. Otherwise, it is the same as the procedure 1. Thus, it is necessary to further use the table η in addition to the table δ in sequence to obtain the transition state q'.

Furthermore, it is necessary, for the sake of the validation of the document type definition corresponding to the tree language of a wider class such as the RELAX, to perform a more complicated validation operation such as seeing some tables in parallel.

As previously mentioned, the background art uses a plurality of transitional relationship tables δ by switching them. To be more specific, a complicated and intricate validation process is implemented. For this reason, a program size for the validation of the XML document becomes larger, so that it requires hardware resources to meet an increase in throughput of the validation (high computation speed, large memory capacity and so on). In addition, the automaton for each content model is generated from the document type definition each time the validation is performed in sequence to provide general versatility. Thus, the program size inevitably becomes larger and processing time becomes longer.

On the other hand, it is demanded that the XML document should be obtained from the Internet and so on and validated by using a small processing apparatus such as a portable telephone or a PDA (personal digital assistant). However, the validators in the past have the complicated process as previously mentioned, and so the load is excessive for such a small processing apparatus of which hardware resources are scarce. Moreover, as previously mentioned, the processing is more complicated and the problem becomes more serious in the cases of the XML schema and the RELAX than the DTD.

SUMMARY OF THE INVENTION

An aspect of the present invention is to simplify processing for the validation of an XML document and improve the processing speed.

Another aspect is to provide means for generating a transitional relationship table capable of simplifying the validation.

A further aspect is to render the size of the program required for validation smaller, and reduce the necessary memory size.

DESCRIPTION OF SYMBOLS

Figure 1:
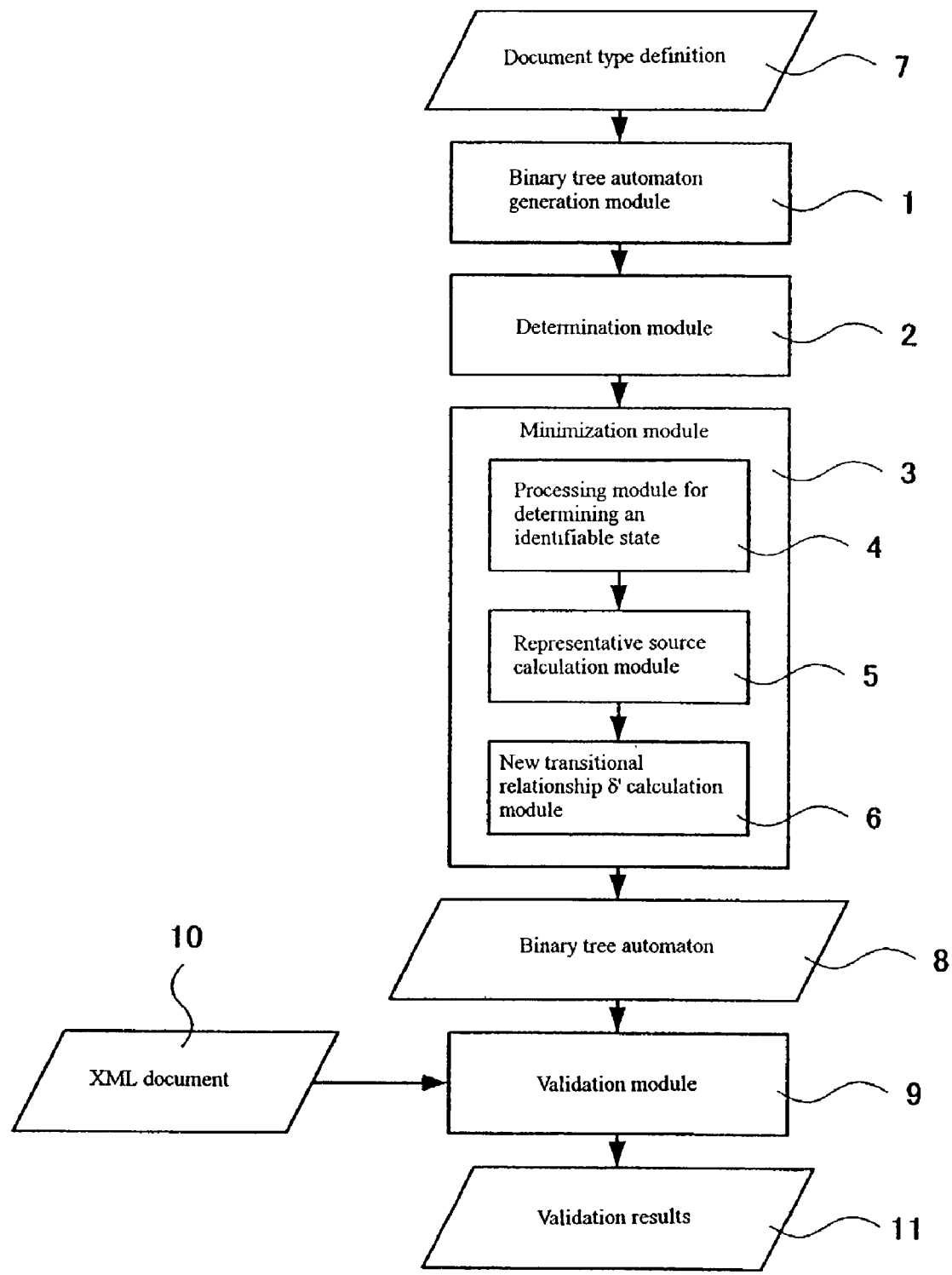
FIG. 1 is a block diagram showing functions as to an example of an automaton generation system and a validation system as one embodiment of the present invention.

1 . . . Binary tree automaton generation module
2 . . . Determination module
3 . . . Minimization module
4 . . . Processing module for determining an identifiable state
5 . . . Representative source calculation module
6 . . . New transitional relationship δ' calculation module
7 . . . Document type definition
8 . . . Minimum deterministic binary tree automaton
9 . . . Validation module
10 . . . XML document
11 . . . Validation results
104 . . . Transitional relationship array division module
105 . . . Binary tree automaton
106 . . . Validation module

DESCRIPTION OF THE INVENTION

An overview of the present invention will be described as follows. To be more specific, validation of an XML document of the present invention detects a similarity among a plurality of table structures (character string automatons) for each content model of the document type definition. This similarity is utilized to coordinate the automaton of each content model and miniaturize it. Otherwise, the plurality of table structures of each content model are coordinated together with a table representing a rule of parentage of the elements so as to render them as a single table structure. And this table is minimized. Once a minimization operation is finished, the validation by a program size and a memory area far smaller than the background art becomes possible. In addition, it is possible to speed up the validation since access to data of the table becomes easier. It is possible, by using this table structure, to create a general-purpose validator for operating at high speed even with a small memory capacity.

The present invention is also described as follows by another representation. An example method of the present invention for generating the automaton for validating the XML Document includes a first step of reading the document type definition of the XML Document, a second step of generating a binary tree automaton from the document type definition, a third step of determining and further minimizing the binary tree automaton and generating a minimum deterministic binary tree automaton. To be more specific, the content model is described by regular representation in most document type definitions, which has a representation ability belonging to a language class called a regular tree language. The present invention converts such a document type definition represented by the language class of the regular tree language into the representation of the language class called a regular binary tree language. To be more specific, it generates the binary tree automaton for representing the document type definition. This binary tree automaton defines a single transitional relationship associated with a tag name of the document type definition, child element row information and sibling element row information of the tag. It is possible to simplify the validation of the XML Document by referring to the single transitional relationship. It is thereby possible to speed up processing of a validator, contract the program size, and render a memory area (stack capacity) smaller. For this reason, the validator using the present invention allows a practical use thereof by a small processing apparatus of which hardware resources are scarce.

Generally, a the method of the present invention for generating the automaton for validating the XML Document includes the first step of reading the document type definition of the XML Document, the second step of generating the binary tree automaton from the document type definition, and a third step of dividing a transition function δ of the binary tree automaton into minimum arrays α and η which make δ[σ, i, j]=α[η[σ, i], j], and the fourth step includes the steps of determining whether each of states represented by combinations of the arrays α and η is the state identifiable with another state, and setting a new status value to the identifiable state and determining by using the new status value the arrays α and η which make δ[σ, i, j]=α[η[σ, i], j]. To be more specific, it is possible to divide the single array α into the minimum arrays α and η which make δ[σ, i, j]=α[η[σ, i], j]. It is thereby possible to contract the table size.

Moreover, it is also possible to grasp the present invention as a system or a program.

Hereafter, particular example embodiments of the present invention will be described based on the drawings. However, the present invention can be implemented in many different forms, and should not be interpreted by limiting it to these embodiments. Moreover, the same elements are given the same numbers throughout the embodiments.

As is clear to those skilled in the art, the methods or the systems described in the following embodiments can also be implemented as the program usable on a computer. Accordingly, the present invention can take the embodiment as hardware, the embodiment as software or the embodiment as a combination of the software and the hardware. The program can be recorded on any computer-readable medium such as a hard disk, a CD-ROM, an optical storage or a magnetic storage.

In addition, the following embodiments can use a general computer system as the system thereof. The computer system usable in the embodiments has the hardware resources generally provided to the computer system such as a central processing unit (CPU), a main memory (RAM), a nonvolatile storage (ROM), a coprocessor, an image accelerator, a cache memory and an input-output controller (I/O). In addition, it has an external memory such as the hard disk and communication means connectable to a network such as the Internet. The computer system includes various computers such as a personal computer, a workstation and a mainframe computer.

(Embodiment 1)

1. System

FIG. 1 shows an example embodiment for a system. FIG. 1 is a block diagram showing functions as to an example of an automaton generation system and a validation system as one embodiment of the present invention. The automaton generation system of this embodiment includes a binary tree automaton generation module 1, a determination module 2 and a minimization module 3. The minimization module 3 includes a processing module 4 for determining an identifiable state, a representative source calculation module 5 and a new transitional relationship $\delta'$ calculation module 6. The automaton generation system has a document type definition 7 inputted, and outputs a binary tree automaton 8. In addition, the validation system of this embodiment includes a validation module 9. The validation module 9 has the binary tree automaton 8 reflecting the content model of the document type definition 7 and an XML Document 10 which is a subject of the validation inputted, and outputs validation results 11. Moreover, each of the above described modules can implement its functions as an independent program component, or it is also possible to combine all or part of the functions thereof and implement them as a program module. Furthermore, it is also possible to divide the functions thereof and implement them as a plurality of program components.

The binary tree automaton generation module 1 receives an input of the document type definition 7, and generates a non-deterministic binary tree automaton for representing the content model of the document type definition 7. To be more specific, it generates, from the document type definition belonging to a language class of a regular tree language (so-called hedge grammar), the automaton belonging to a regular binary tree language class in a unique relationship therewith. The binary tree automaton is represented by a tuple of five components of $<\Sigma, Q, \delta, I, F>$. Here, $\Sigma$ is a set (alphabet) based on a tag name $\sigma$, and Q is a state set. $\delta$ is not a transition function per content model as with the past automaton, but is constituted as the single transition function (a table or an array) reflecting the content models of all the elements. The transition function $\delta$ of the binary tree automaton provides a transition state when the tag name $\sigma$, child element row information qc and sibling element row information qb thereof are specified. For instance, the transition function $\delta$ can be implemented by recording the transition state as the element of a three-dimensional array of which index is ($\sigma$, qc, qb). Moreover, while this embodiment illustrates the method for implementing the transition function $\delta$ by the arrays, it can be implemented by the table and any means of associating ($\sigma$, qc, qb) with the transition state. An initial state set I and a set of final states F are subsets of the state set Q, and an input document is accepted if it starts from a state q0 included in the initial state set I and reaches the state included in the set of final states F.

The determination module 2 has the function of determining the non-deterministic binary tree automaton generated by the binary tree automaton generation module 1. To be more specific, it converts a non-deterministic automaton of which state transition function is a multivalued function into a deterministic automaton which is a unique function. For instance, it is implemented by regarding the state set which the transition state function $\delta$ of the non-deterministic automaton can take as the "state" of the transition function of the deterministic automaton.

The minimization module 3 has the function of minimizing the size of deterministic binary tree automaton determined by the determination module 2. If a plurality of identifiable states are included in the determined deterministic binary tree automaton, it renders them as one state. The identifiable states are determined by the processing module 4. If the identifiable states are determined, the representative source which is the source of the smallest number, for instance, of the identifiable states is calculated by the representative source calculation module 5. From the set of the representative sources, a new transitional relationship $\delta'$ is calculated by the calculation module 6.

The binary tree automaton 8 calculated by each of the above modules is represented by a tuple of five components of $<\sigma, Q, \delta', I, F>$. This binary tree automaton 8 and the XML Document 10 are inputted so as to have the XML Document 10 validated by the validation module 9. The validation module 9 outputs the validation results 11 as to whether or not the inputted XML Document 10 is accepted by the binary tree automaton 8, where the XML Document 10 is valid if it is accepted, and it is not valid if it is not accepted.

Moreover, it is also possible to constitute the validation system by integrating the above described automaton generation system into the validation system. In addition, it is also feasible to independently constitute the automaton generation system and input the binary tree automaton 8 generated thereby to a general-purpose validation system so as to validate the XML Document.

2. Method

The present invention may be embodied as a method implementing the procedures of the automaton generation system and the validation system shown in FIG. 1. The example method will be described by using a flowchart and a pseudocode. An overview of the procedure of the validation of the XML Document is as follows. To be more specific, the document type definition 7 is given, and the following procedures are performed to generate the minimum deterministic binary tree automaton 8. (1) Generation of the non-deterministic binary tree automaton by the binary tree automaton generation module 1. (2) Determination by the determination module 2. (3) Minimization by the minimization module 3. And the minimum deterministic binary tree automaton 8 and the XML document 10 are given, and (4) the validation by the validation module 9 is performed. The procedures will be described hereafter. Moreover, the number in parenthesis indicated at the beginning of each line shows a line number, and does not constitute the program. In addition, each code sequence is strictly pseudo and does not assure regular operation on a specific computer. To implement it so as to actually operate on the specific computer, it needs to be rewritten to comply with an operating system of the computer or the grammar unique to the programming language. There is no specific constraint to the programming language for implementing the system of this embodiment.

2.0 Data Structure

Now the data structure is described. In the method (algorithm) described hereafter, the non-deterministic binary tree automaton <Σ, Q, δ, I, F> and the deterministic binary tree automaton <Σ, Q, δ, q0, F> have the following structure. To be more specific, the state set Q is a set (array) of certain objects. The initial state set I is the subset (array) of Q. The initial state q0 is the element of Q. The set of final states F is the subset (array) of Q. The transition function δ of the non-deterministic automaton is different form that of the deterministic automaton. When it is the non-deterministic automaton, the transition function δ is the function from a triplet of [σ, q1, q2] to the subset of Q. When it is the deterministic automaton, the transition function δ is the function from a triplet of [σ, q1, q2] to the element of Q. δ can be represented by a three-dimensional array and so on in either case. In addition, σ is corresponding to an XML element name and is a source of the alphabet Σ.

2.1 Grammar of the Document Type Definition (Hedge Grammar)

Grammar G of the regular tree language (hedge grammar) for representing the document type definition is represented by a string of grammatical declaration X=t comprised of a non-terminal symbol X and the following regular expression t and a start signal $X_s$. If X=t in the grammar G, t is represented by G[X].

| (regular expression t) | |
|---|---|
| t::=t\|t | (choice) |
| \|tt | (sequence) |
| \|t* | (Star) |
| \|σ<X> | (element) |
| \|ε | (terminal symbol) |

2.2 Conversion to the Binary Tree Automaton Corresponding to the Grammar G

Figure 2:
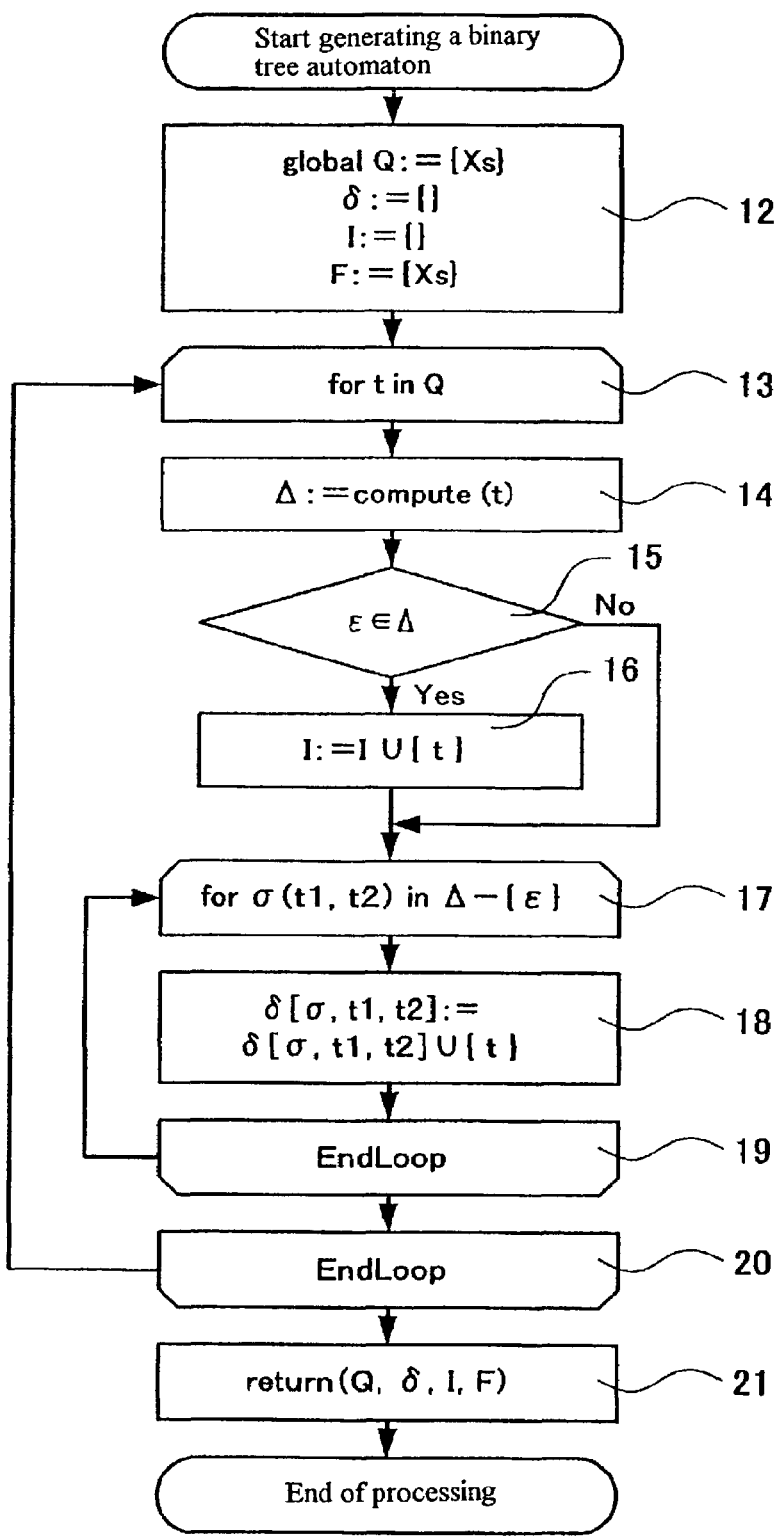
FIG. 2 is a flowchart showing an example of the procedure for acquiring the binary tree automaton corresponding to the grammar G.

FIG. 2 is a flowchart showing an example of the procedure for acquiring the binary tree automaton corresponding to the grammar G. In addition, a pseudocode 1 shown below is an example of the program (binary tree automaton generation module 1) for implementing the process corresponding to the procedure shown in FIG. 2. Moreover, the above described data structure and the algorithm for conversion to the binary tree automaton described here are the same as the method used for implementing the system called "XDuce." The "XDuce" is described in detail in "Haruo Hosoya. Regular Expression Types for XML. Phd thesis, The University of Tokyo, December 2000. (http://www. Kurims, Kyoto-u.ac.jp/~hohosoya/papers/phdth.ps)" or "http://xduce.sourceforge.net," incorporated herein by reference in entirety for all purposes.

| (Pseudocode 1) | |
|---|---|
| (01.01) | proc main(G,Xs) |
| (01.02) | global Q := {Xs} |
| (01.03) | δ:={ } |

| -continued | |
|---|---|
| (Pseudocode 1) | |
| (01.04) | I:={ } |
| (01.05) | F:={ } |
| (01.06) | for t in Q |
| (01.07) | Δ := compute(t) |
| (01.08) | if (ε∈Δ) then I := I ∪ {t} |
| (01.09) | for σ(t1,t2) in Δ-{ε} |
| (01.10) | δ[σ,t1,t2] := δ[σ,t1,t2] ∪ {t} |
| (01.11) | rof |
| (01.12) | rof |
| (01.13) | return (Q,δ,I,F) |
| (01.14) | corp |

The binary tree automaton is represented by the set of five terms as previously mentioned. The alphabet Σ is a set of the elements σ which appear in the document type definition (that is, also the elements of the XML document), and the automaton is acquired if a set of four terms of (Q, δ, I, F) is acquired by the above described program. The state, that is, the elements of Q are corresponding to t appearing in the grammar and t obtained by rewriting it. A conversion algorithm depends on a recursive call of the procedure compute. t which is given as an argument of compute is rewritten until it takes the form of t1σ<X>. Intuitively speaking, σ<X> is taken one by one out of the right end of t to obtain one transition, and also a new t is obtained. This operation is repeated until no more σ<X> can be taken out. Moreover, global represents a global variable. Switch t is assumed to branch according to the shape of t.

First, the grammar G representing the document type definition and the start signal Xs are passed as the arguments to the binary tree automaton generation module 1 (line number 01.01). The binary tree automaton generation module 1 refers to the received arguments, and performs initialization as shown between the line numbers 01.02 and 01.05 (step 12). Next, for all the t in the set Q (step 13, line number 01.06), the processing between the line numbers 01.07 and 01.11 is repeated (step 13, 20). The elements in Q increase in a loop (recursive call of compute), but they stop increasing before long. At line number 01.07, the recursive call function compute is executed with t as the argument, and is substituted in the set Δ (step 14). The recursive call function compute will be described later.

It is determined whether a terminator ε is included in Δ (step 15), and {t} is added to I if it is true (step 16, line number 01.08). To be more specific, if compute (t) includes ε, t is the initial state. Next, the following operation is performed for σ in Δ excluding {ε} (line numbers 01.09 to 01.11, steps 17 to 19). To be more specific, {t} is added to δ[σ, t1, t2] associating σ, t1 and t2 as one of its sources (line number 01.10, steps 18). When σ is taken out by compute (t), {t} provides the state to which σ can transition in a (t1, t2) state. When the above processing is finished, (Q, δ, I, F) is acquired (step 21, line number 01.13).

Figure 3:
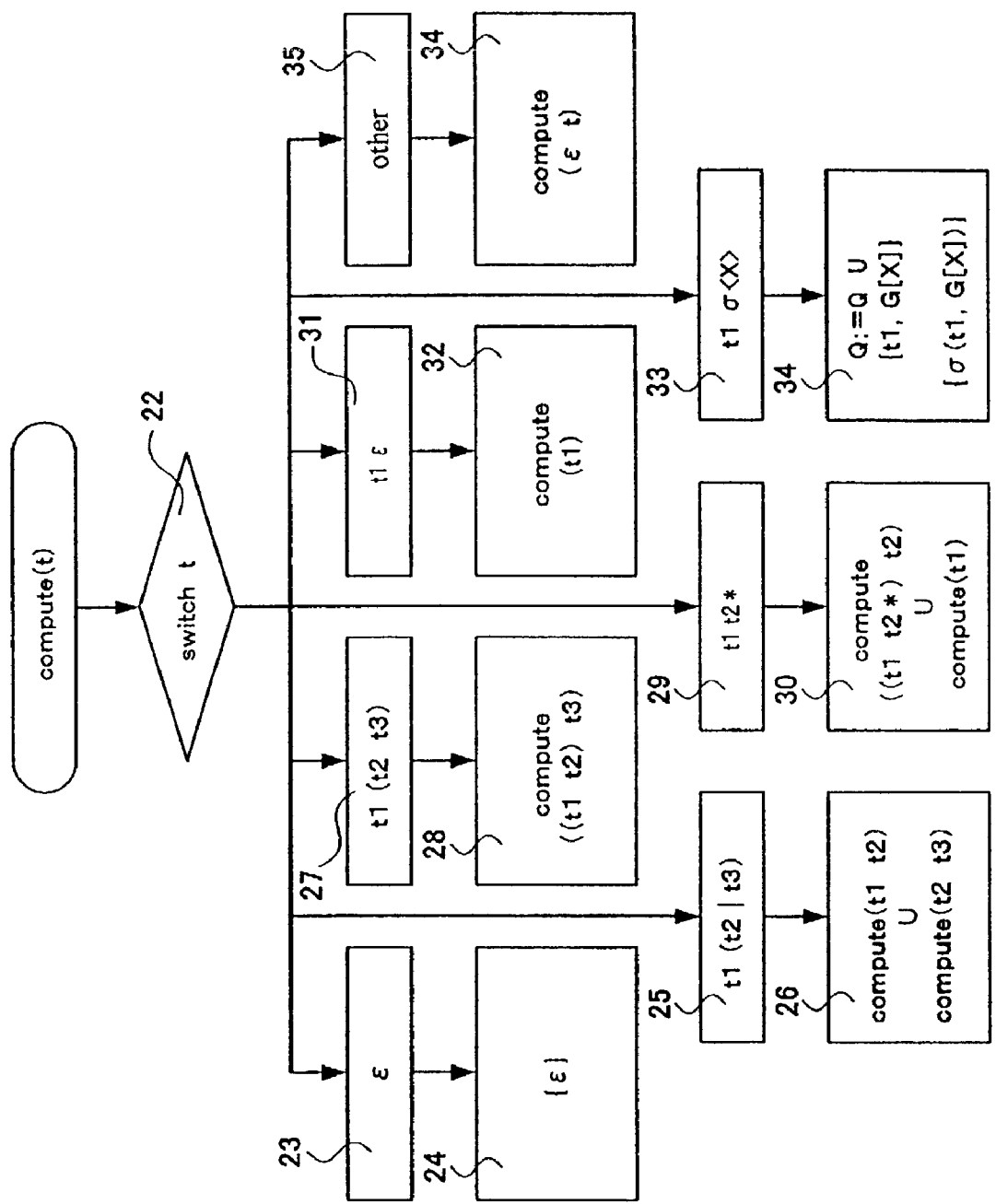
FIG. 3 is a flowchart showing an example of the recursive call function compute (t)

FIG. 3 is a flowchart showing an example of the recursive call function compute (t). A pseudocode 2 shown below is an example of the program for implementing the processing of compute (t).

| (Pseudocode 2) | |
|---|---|
| (02.01) | proc compute(t) |
| (02.02) | switch t |

-continued (Pseudocode 2)

| | |
|---|---|
| (02.03) | case ε: |
| (02.04) | return {ε} |
| (02.05) | case t1 (t2 | t3): |
| (02.06) | return compute (t1 t2) ∪ compute (t2 t3) |
| (02.07) | case t1 (t2 t3): |
| (02.08) | return compute((t1 t2) t3) |
| (02.09) | case t1 t2*: |
| (02.10) | return compute((t1 t2*) t2) ∪ compute(t1) |
| (02.11) | case t1 ε: |
| (02.12) | return compute(t1) |
| (02.13) | case t1 σ<X>: |
| (02.14) | Q := Q ∪ {t1,G[X]} |
| (02.15) | return {σ(t1,G[X])} |
| (02.16) | otherwise: |
| (02.17) | return compute(ε t) |
| (02.18) | hctiws |
| (02.19) | corp |

The function compute (t) has its processing branched according to the type of the argument t (line number 02.02, step 22).

If t is ε (line number 02.03, step 23), the set {ε} based on ε is returned as a return value of the function compute (line number 02.04, step 24).

If t is sequence and the term on the right thereof is choice, that is, t is a sequence of selection of a first regular expression (t1), a second regular expression (t2) and a third regular expression (t3) (line number 02.05, step 25), the compute (t) of which argument is the sequence of t1 and t2 is recursively called, and a sum set of the results thereof and the result set of the recursive compute (t) of which argument is the sequence of t1 and said t3 is returned as the return value (line number 02.06, step 26).

If t is the sequence and the term on the right thereof is the sequence, that is, in the case of the sequence of t1 with the sequence of t2 and t3 (line number 02.07, step 27), the result set of the compute (t) of which argument is the sequence of t1 and t2 with the sequence of t3 is returned as the return value (line number 02.08, steps 28).

If t is the sequence and the term on the right thereof is repetition of an arbitrary number of times (star), that is, in the case of the sequence of the repetitions of t1 and t2 (line number 02.09, step 29), the sum set of the result set of the compute (t) of which argument is the sequence of the repetitions of t1 and t2 and the sequence of t2 and the result set of the compute (t) of which argument is t1 is returned as the return value (line number 02.10, step 30).

If t is the sequence and the term on the right thereof is a terminal symbol, that is, if t is the sequence of t1 and ε (line number 02.11, steps 31), the result set of the compute (t) of which argument is t1 is returned as the return value (line number 02.12, step 32).

If t is the sequence and the term on the right thereof is the element, that is, if t is the sequence of t1 and σ (line number 02.13, step 33), and a state element (G[X]) corresponding to t1 and t is added to Q (line number 02.14), and σ (t1, G[X]) is returned as the return value (line number 02.14, step 34).

If t is other than the above (line number 02.15, step 35), the compute (t) of which argument is the sequence of ε and t is recursively called (line number 02.16, step 36). To be more specific, ε is added to t as a dummy to take form of the sequence and recursively call the compute (t) so as to apply to other cases.

The recursive call function compute as above is executed to take the element σ out of t and rewrite t to t1. And this is added to Q which is a global variable. Thus, Q increases in conjunction with execution of the compute. However, Q stops increasing before long, and the compute (t) will be calculated for all the elements t of Q.

2.3 Determination

Now the determination process is described. Determination is the process of constructing the deterministic binary tree automaton from the non-deterministic binary tree automaton. The deterministic binary tree automaton is created from the state set Q, the transition function δ and the set of final states F (subset of Q) of the non-deterministic binary tree automaton. The basic idea is to regard the set of the states which the non-deterministic binary tree automaton can take as the "state." To be more specific, the state of the deterministic binary tree automaton is the subset of Q.

Figure 4:
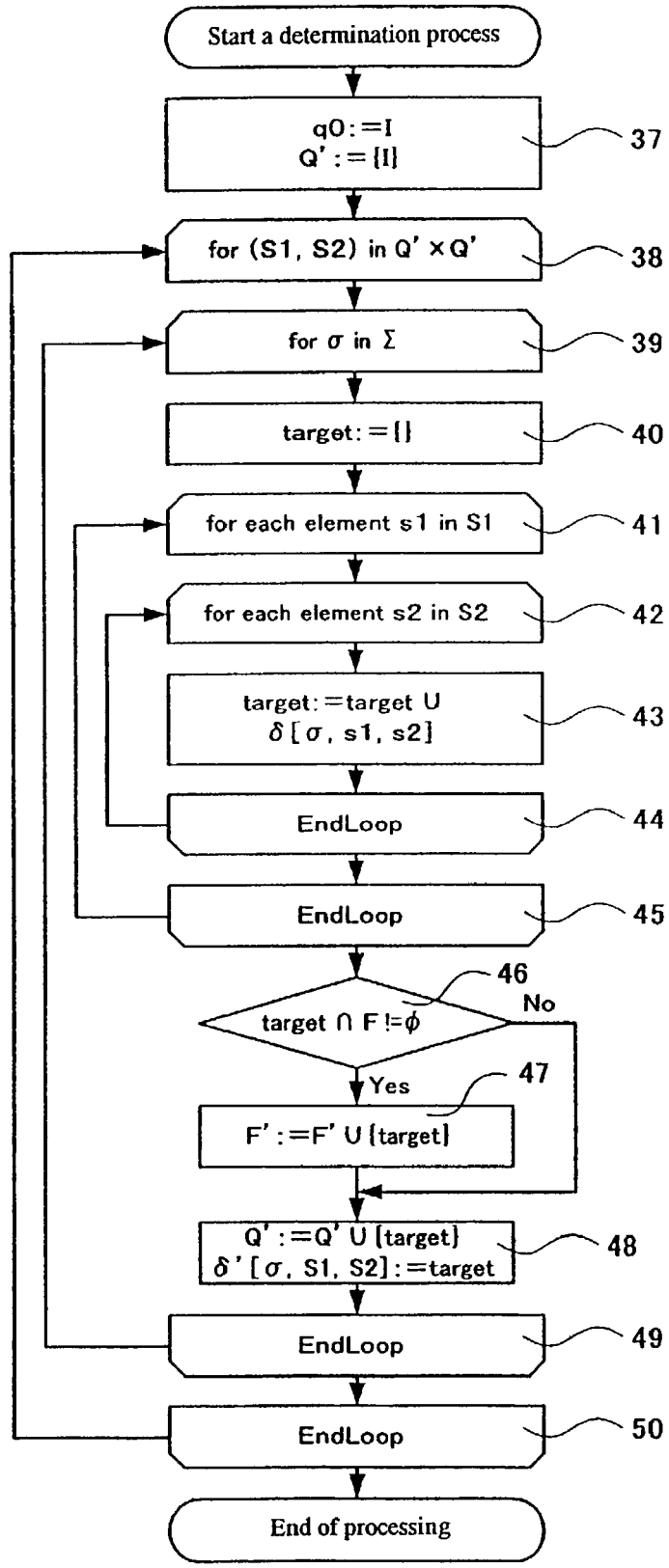
FIG. 4 is a flowchart showing an example of the procedure of the determination.

FIG. 4 is a flowchart showing an example of the procedure of the determination. In addition, a pseudocode 3 shown below shows an example of the program for implementing the procedure for acquiring the deterministic binary tree automaton <Σ, Q', δ', q0, F'> from the non-deterministic binary tree automaton <Σ, Q, δ, q0, F>. As there is no change in Σ and q0, a set of three terms of (Q', δ', F') can be acquired from the set of three terms of (Q, δ, F).

(Pseudocode 3)

| | |
|---|---|
| (03.01) | q0 := I |
| (03.02) | Q' := {I} |
| (03.03) | for (S1,S2) in Q'×Q' |
| (03.04) | for σ in Σ do |
| (03.05) | target := { } |
| (03.06) | for each element s1 in S1 do |
| (03.07) | for each element s2 in S2 do |
| (03.08) | target := target ∪ δ[σ,s1,s2] |
| (03.09) | rof |
| (03.10) | rof |
| (03.11) | if target ∩ F is not empty |
| (03.12) | then F' := F' ∪ {target} |
| (03.13) | Q' := Q' ∪ {target} |
| (03.14) | δ'[σ,S1,S2] := target |
| (03.15) | rof |
| (03.16) | rof |

First, as shown at the line numbers 03.01 and 03.02, the initialization is performed (step 37). The initialization at the line number 03.01 means that the set comprised of the entire start state is the "start state," and the line number 03.02 means that the "state" acquired at this point in time is only the "start state."

As for Q'×Q', that is, each of the sibling element row information and the child element row information, any unexamined pair (S1, S2) of the element thereof is taken out (line number 03.03, step 38). A set target is prepared for an arbitrary symbol σ in the alphabet Σ (line number 03.04, step 39). First, the element of the target is rendered empty (line number 03.05, step 40). Next, the following operation is repeated as to each element of a state s1 belonging to S1 and further a state s2 belonging to S2. To be more specific, all the states δ reachable from (σ, s1, s2) are added to the target (line number 03.06 to 3.10, steps 41 to 45). Next, it is determined whether an intersection of the target and F is empty (line number 03.11, steps 46), and the target is added to F' if the determination is true (line number 03.12, step 47). If the above described determination is false, it proceeds to a step 48. In the step 48, the target is added to Q' (line number 03.13), and a destination to be reached from (σ, S1, S2) is rendered as the target (line number 03.14, step 48).

(Q', δ', F') can thus be acquired, and the deterministic automaton <σ, Q', δ', q0 F'> is acquired.

2.4 Minimization

Figure 5:
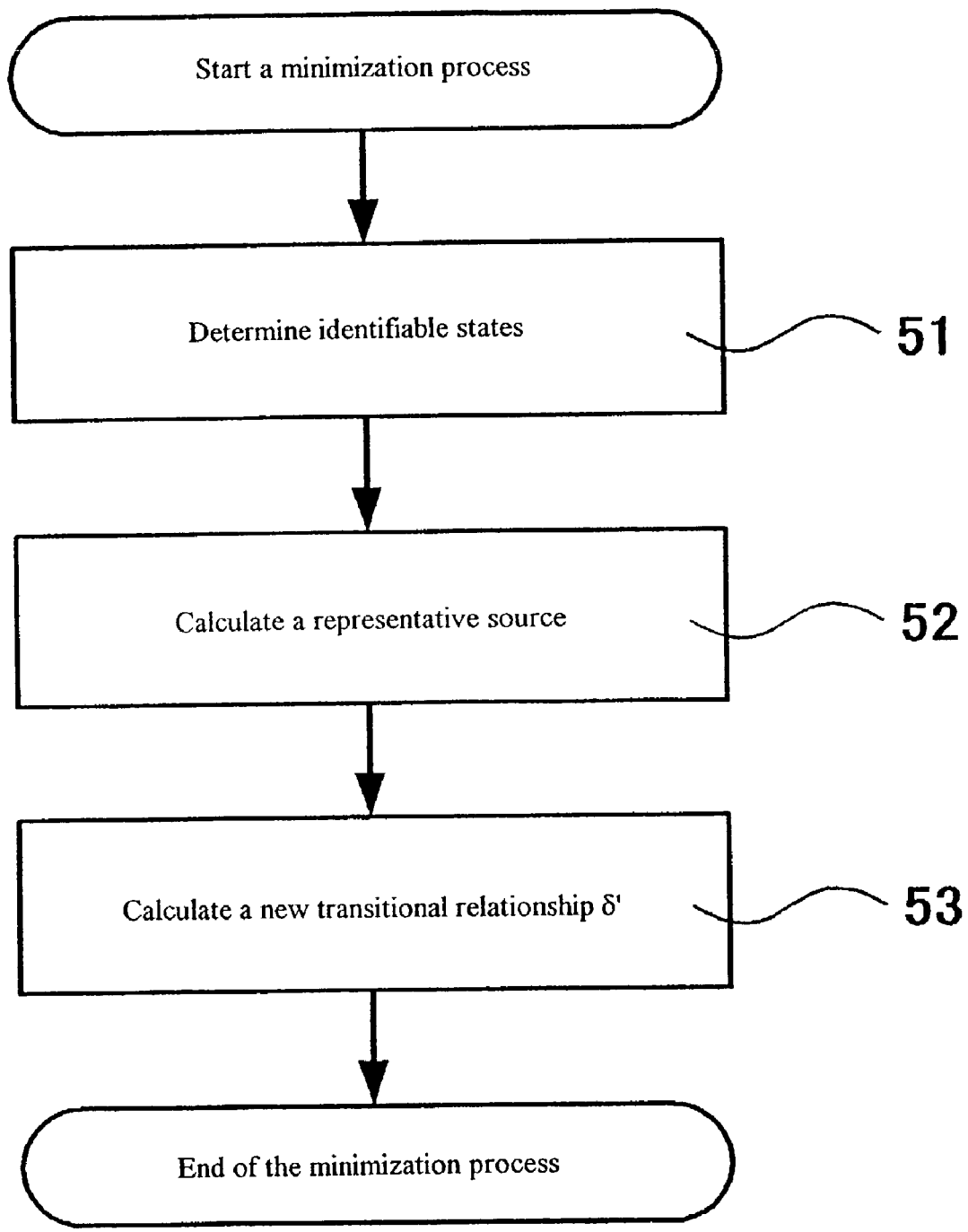
FIG. 5 is an overview flowchart showing an example of the procedure of the minimization.

Minimization is, of the states of the deterministic automaton generated by the above described determination, to find the identifiable states and simplify the state transition function. FIG. 5 is an overview flowchart showing an example of the procedure of the minimization. The procedure of the minimization includes the following steps. (1) Determination of the identifiable state (step 51), (2) calculation of the representative source (step 52), and (3) calculation of the new transition function δ' (step 53).

(1) Determination of the Identifiable State

Figure 6:
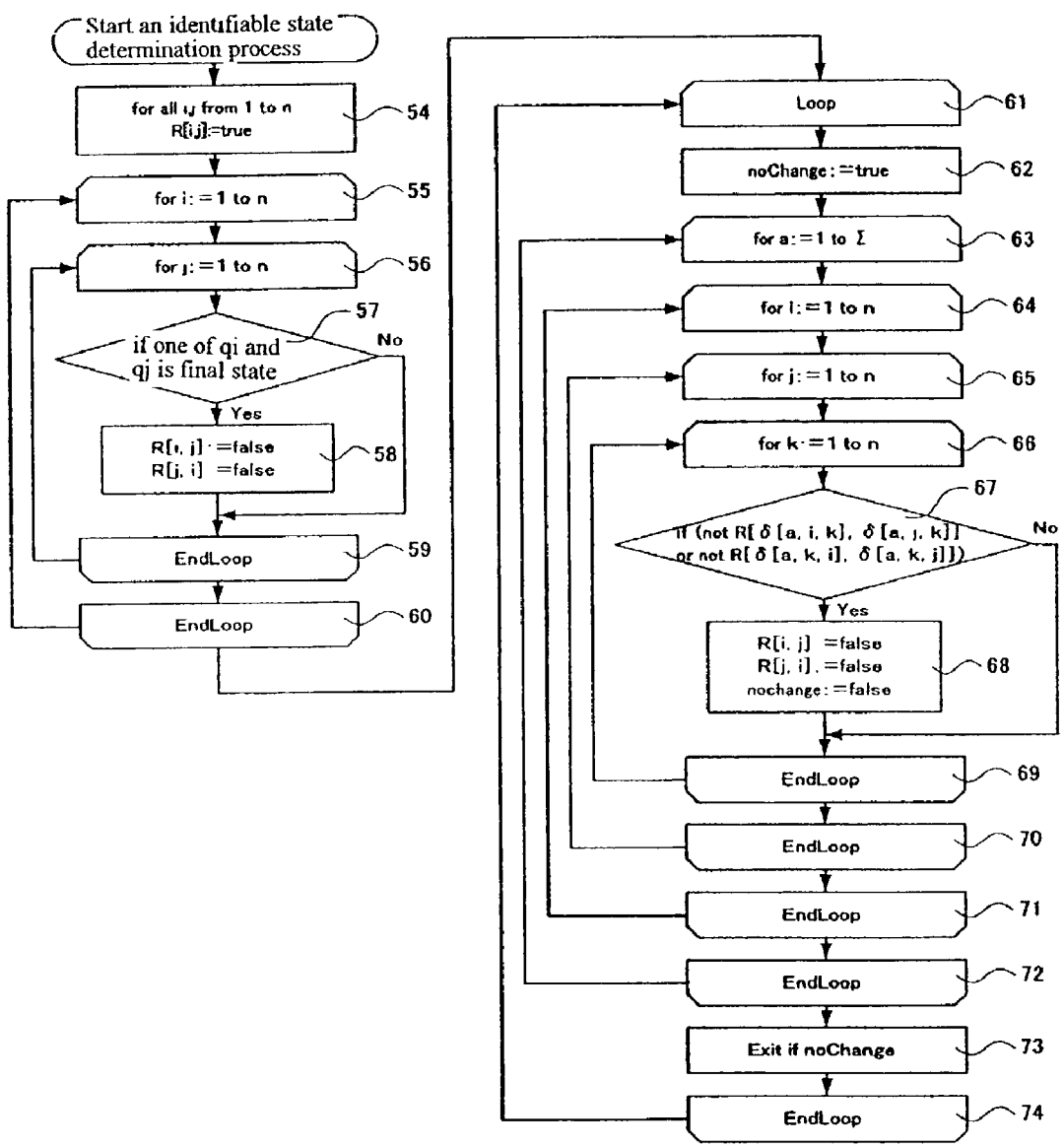
FIG. 6 is a flowchart showing an example of the procedure for determining an identifiable state.

FIG. 6 is a flowchart showing an example of the procedure for determining the identifiable state. In addition, a pseudocode 4 shown below shows an example of the program for implementing the process of determining the identifiable state. First, the number of states is assumed to be n. In addition, the states of the automaton are assumed to be represented by integer values from 0 to n−1. The basic idea is to find the identifiable states. The procedure described below gradually determines those which are not identifiable. The following procedure creates a two-dimensional array R[n, n], and if it turns out that a certain state i and a state j are not identifiable, it sets both R[i, j] and R[j, i] as false.

| (Pseudocode 4) | |
|---|---|
| (04.01) | for i := 1 to n do |
| (04.02) |   for j := 1 to n do |
| (04.03) |     if only one of qi and qj is final state |
| (04.04) |       R[i,j] := false |
| (04.05) |       R[j,i] := false |
| (04.06) |     fi |
| (04.07) |   rof |
| (04.08) | rof |
| (04.09) | loop |
| (04.10) |   noChange := true |
| (04.11) |   for a in Σ do |
| (04.12) |     for i := 1 to n do |
| (04.13) |       for j := 1 to n do |
| (04.14) |         for k := 1 to n do |
| (04.15) |           if (not R[δ[a,i,k], δ[a,j,k]] |
| (04.16) |             or not R[δ[a,k,i], δ[a,k,j]]) |
| (04.17) |           then {R[i,j] := false ; |
| (04.18) |               R[j,i] := false ; |
| (04.19) |               noChange := false} |
| (04.20) |           fi |
| (04.21) |         rof |
| (04.22) |       rof |
| (04.23) |     rof |
| (04.24) |   rof |
| (04.25) |   exit if noChange |
| (04.26) | pool |

First, all the sources of R are initialized as true (step 54). To be more specific, none of them is clearly unidentifiable at the beginning.

A for loop at the line numbers 04.01 to 04.08 performs the process wherein the final state is not identifiable with the state which is not the final state. To be more specific, the following operation is repeated for i of 1 to n (line number 04.01, step 55) and further for j of 1 to n (line numbers 04.02, steps 56) (line numbers 04.07 and 04.08, steps 59 and 60). It is determined whether only one of qi and qj is the final state (line number 04.03, step 57). If the above described determination is true, it sets R[i, j] and R[j, i] as false (line numbers 04.04 and 04.05, step 58).

Next, two states which reach the two states apparently unidentifiable are not identifiable, either. The loop at the line numbers 04.09 to 04.26 performs that determination. To be more specific, at the line numbers 04.10, noChange flag signifying whether or not the status of R is changed is set as true (step 62), the following operation is repeated for a in Σ, i of 1 to n, further for j of 1 to n, and further for k of 1 to n (line number 04.11 to 04.24, steps 63 to 72). To be more specific, it is determined, as to arbitrary i, j, k and σ, whether the two states δ[σ, i, k] and δ[σ, j, k] are distinguished by R, or whether the two states δ[σ, k, i] and δ[σ, k, j] are distinguished by R (line number 04.15 to 04.16, step 67). When this determination is true, it renews R to distinguish the states i and j. To be more specific, it sets R[i, j] and R[j, i] as false, and also sets noChange as false (line number 04.17 to 04.19, steps 68). And if noChange is true, it gets out of the loop (line number 04.05, step 73). When this loop is terminated, the identifiable state is determined.

(2) Calculation of the Representative Source

Figure 7:
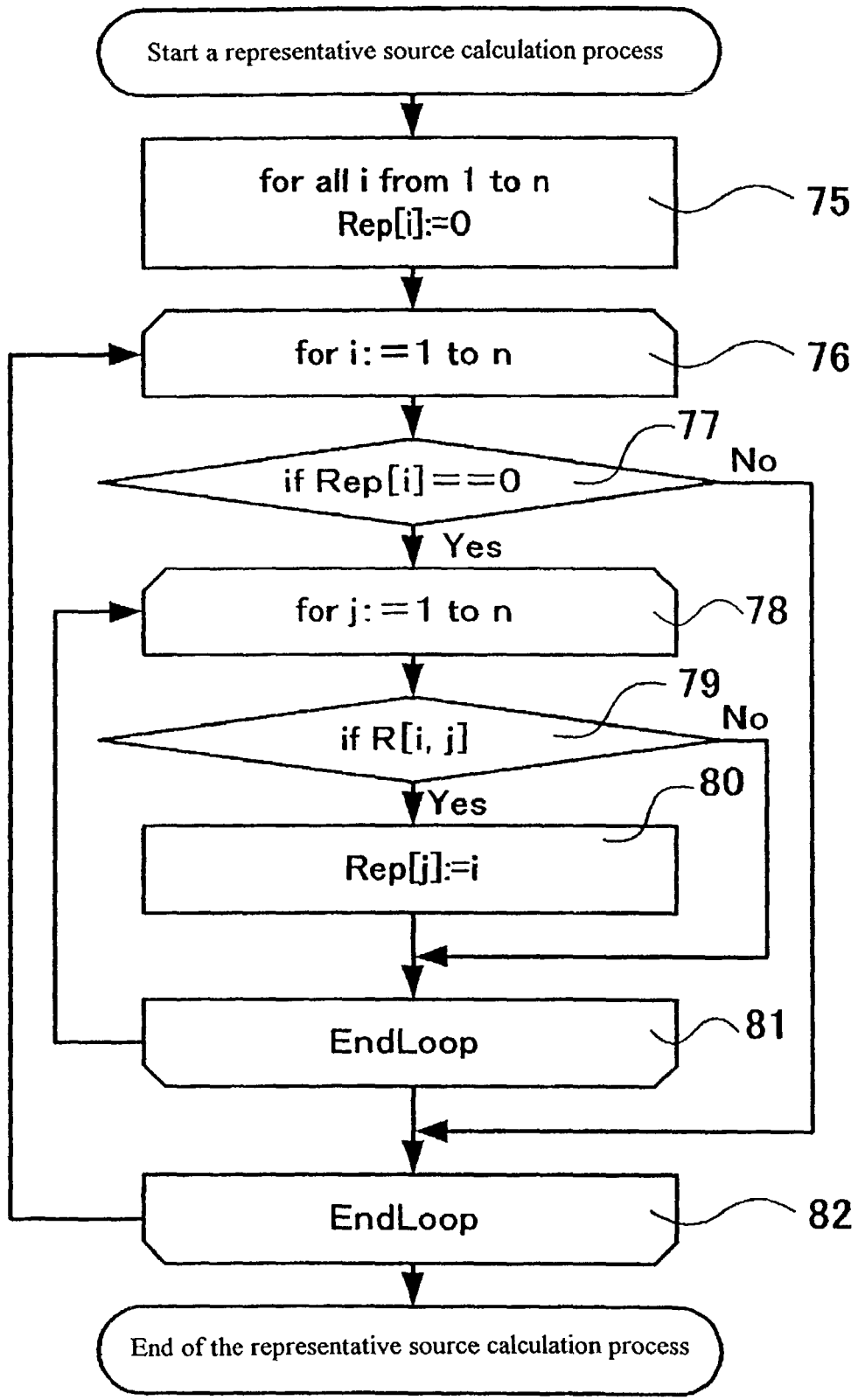
FIG. 7 is a flowchart showing an example of the procedure for calculating a representative source.

Next, an array Rep[n] is created. This is the array for indicating the representative source (the one of the lowest number of the identifiable states). FIG. 7 is a flowchart showing an example of the procedure for calculating the representative source. In addition, a pseudocode 5 shown below shows an example of the program for implementing the calculation of the representative source.

| (Pseudocode 5) | |
|---|---|
| (05.01) | for every i from 1 to n |
| (05.02) |   Rep[i]:= 0 |
| (05.03) | rof |
| (05.04) | for i := 1 to n do |
| (05.05) |   if Rep[i] == 0 then |
| (05.06) |     for j := 1 to n do |
| (05.07) |       if R[i,j] then Rep[j] := i |
| (05.08) |     rof |
| (05.09) |   fi |
| (05.10) | rof |

First, Rep[i] is initialized by 0 for all i of 1 to n (line number 05.01 to 05.03, step 75). It indicates that the representative source is unknown in the initial state. Next, it is determined whether Rep[i] is 0 for i of 1 to n (line number 05.05, step 77), so that i itself becomes the representative source if it is 0. And in this case (if it is 0), it is determined whether Rep[i, j] is true as to j of 1 to n (step 79), and i is substituted into Rep[j] if it is true (line number 05.07, step 80). To be more specific, i is written as the representative source to other states which are identifiable.

(3) Calculation of the New Transition Function δ'

Figure 8:
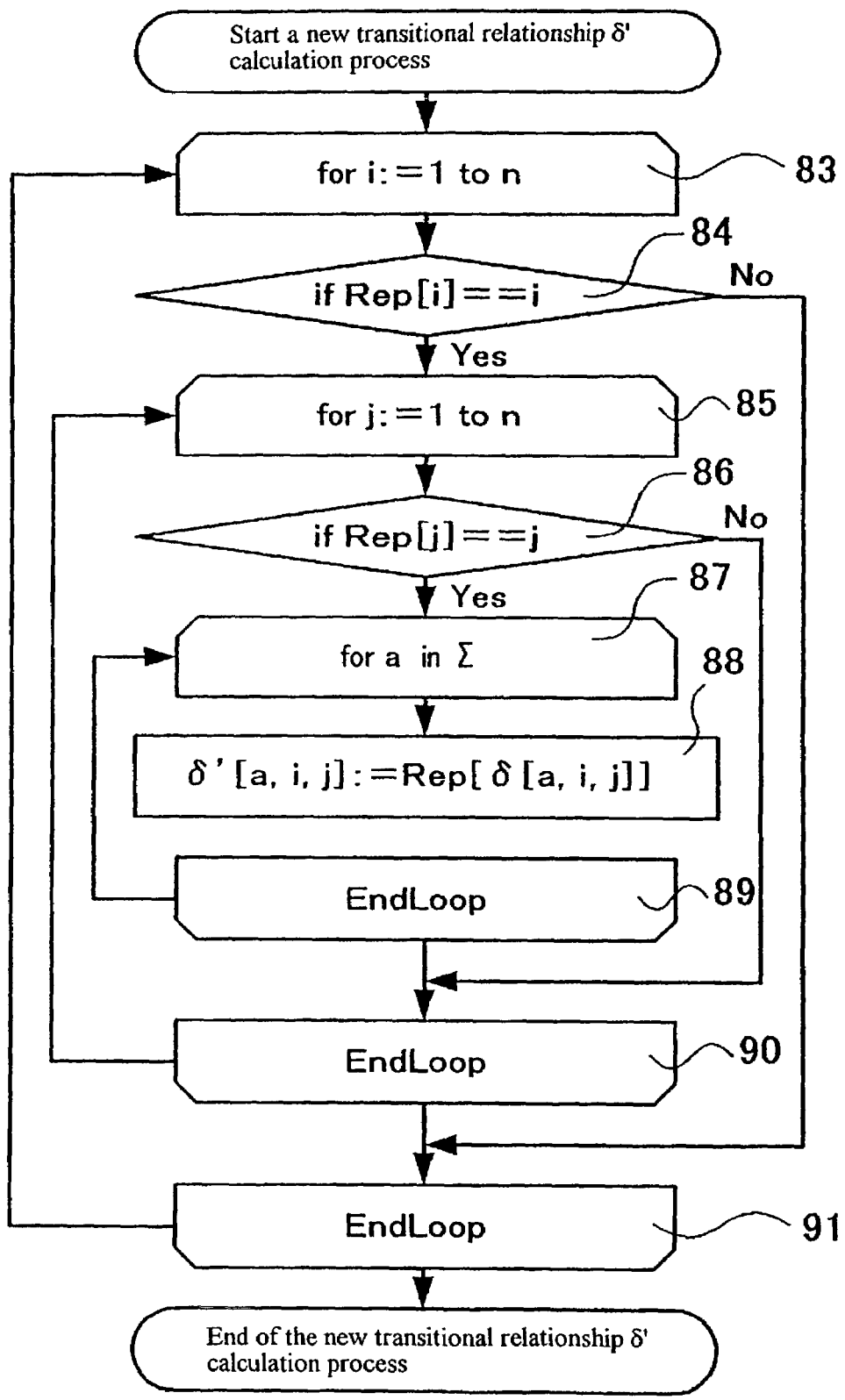
FIG. 8 is a flowchart showing an example of the procedure of the calculation of the new transition function δ'.

FIG. 8 is a flowchart showing an example of the procedure of the calculation of the new transition function δ'. In addition, a pseudocode 6 shown below shows an example of the program for implementing the calculation of the new transition function δ'.

| (Pseudocode 6) | |
|---|---|
| (06.01) | for i := 1 to n do |
| (06.02) |   if Rep[i] == i then |
| (06.03) |     for j := 1 to n do |

-continued (Pseudocode 6)

| | |
|---|---|
| (06.04) | if Rep[j] == j then |
| (06.05) | for a in Σ do |
| (06.06) | δ'[a,i,j] := Rep[δ[a,i,j]] |
| (06.07) | rof |
| (06.08) | fi |
| (06.09) | rof |
| (06.10) | fi |
| (06.11) | rof |

As shown above, if Rep[i] is i for i of 1 to n (line number 06.02, step 84) and Rep[j] is j for j of 1 to n (line number 06.04, step 86), Rep[δ[a, i, j]] is substituted into δ'[a, i, j] for each element a in Σ (line number 06.06, step 88). As δ[a, i, j] may not be the representative source, the representative source is obtained by using Rep. This is repeated for all the i and j.

The procedures described in the above 2.1 to 2.4 are performed so as to generate the minimum deterministic binary tree automaton 8 from the document type definition described in the hedge grammar.

2.5 Concrete Example of the Minimum Deterministic Binary Tree Automaton

The automaton generated by the procedures of the above 2.1 to 2.4 is shown below by taking the aforementioned sample DTD as an example. The minimum deterministic binary tree automaton is represented by the above described set of five terms of <Σ, Q', δ', q0 F'>. Σ={doc, title, section, para}, Q'={0, 1, 2, 3, 4}, q0={0}, F'={4}, and δ' is as shown in Table 4.

TABLE 4

| | doc | | | | | title | | | | | section | | | | | para | | | | |
|---|---|---|---|---|---|---|---|---|---|---|---|---|---|---|---|---|---|---|---|---|
| | $0^I$ | 1 | 2 | 3 | $4^F$ | $0^I$ | 1 | 2 | 3 | $4^F$ | $0^I$ | 1 | 2 | 3 | $4^F$ | $0^I$ | 1 | 2 | 3 | $4^F$ |
| $0^I$ | — | — | — | 4 | — | 1 | — | — | — | — | — | — | — | — | — | — | — | — | — | — |
| 1 | — | — | — | — | — | — | — | — | — | — | — | — | — | 3 | 3 | — | 2 | — | — | — |
| 2 | — | — | — | — | — | — | — | — | — | — | — | — | — | — | — | — | — | — | — | — |
| 3 | — | — | — | — | — | — | — | — | — | — | — | — | — | 3 | 3 | — | — | — | — | — |
| $4^F$ | — | — | — | — | — | — | — | — | — | — | — | — | — | — | — | — | — | — | — | — |

Thus, the automaton of this embodiment is represented by a single table. For this reason, the procedures of the validation of the XML document described below are simplified. In addition, the memory area (stack capacity) for the validation can be rendered smaller. Moreover, in Table 4, the top side corresponds to the tag name and the child element row information, and the left side corresponds to the sibling element row information. In addition, the table of Table 4 can be implemented by a hash table since it is generally loose.

2.6 Validation of the XML Document

Figure 9:
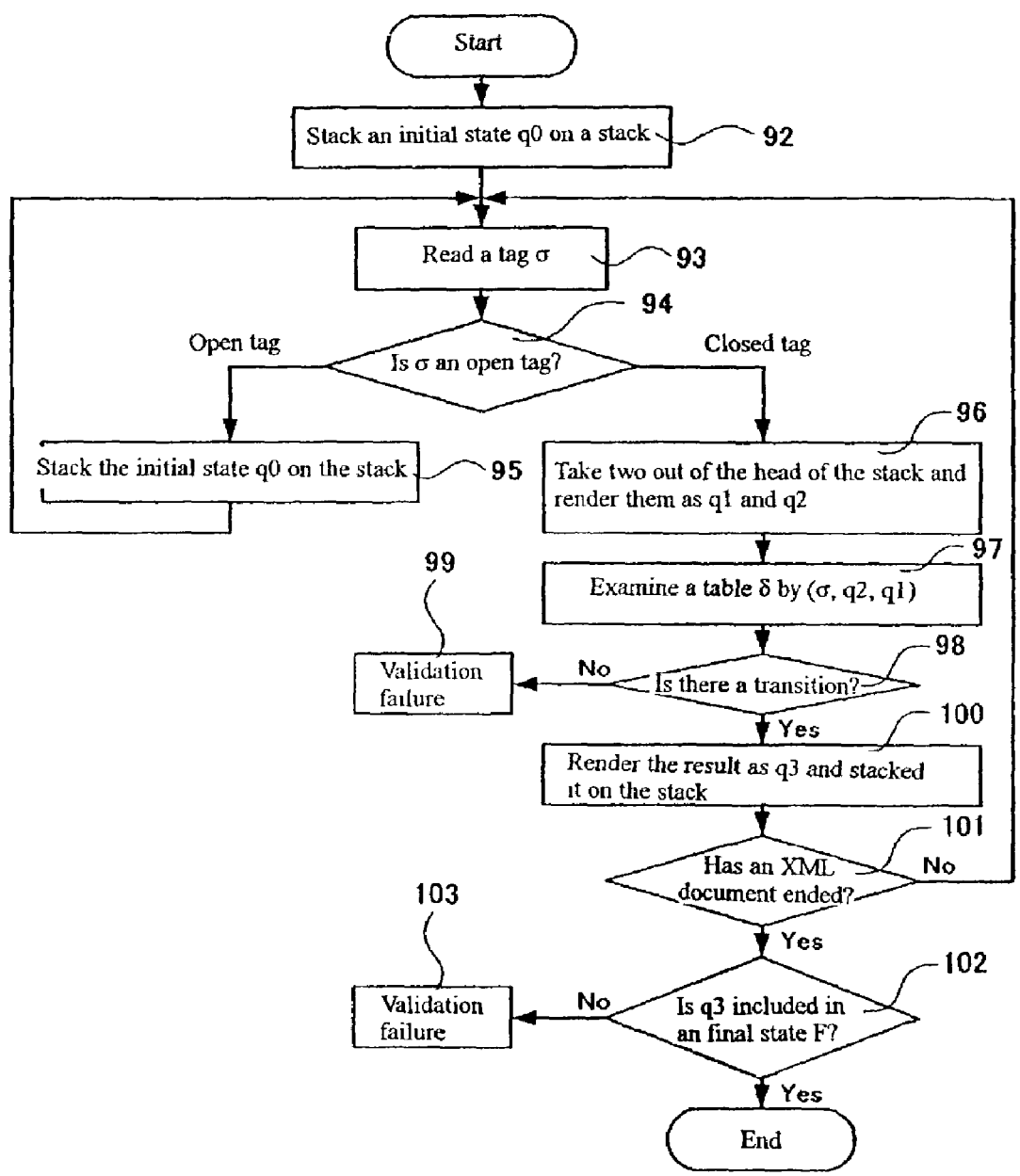
FIG. 9 is a flowchart showing an example of the procedure of the validation which is an embodiment of the present invention.

The procedures for validating the XML document by using the above described minimum deterministic binary tree automaton will be described below. FIG. 9 is a flowchart showing an example of the procedure of the validation of this embodiment. In addition, a pseudocode 7 is an example of the program for implementing the procedure of the validation. Moreover, the automaton is represented by <Σ, Q, δ, I, F>, and the transitional relationship among the states q1, q2 and q3 is δ[σ, q1, q2]->q3. The structure of the XML document is associated with the occurrence rows of the following two events by a SAX parser for instance. To be more specific, startElement (String tag) is executed if a start tag is read, and endElement (String tag) is executed if an end tag is read.

(Pseudocode 7)

| | |
|---|---|
| (07.01) | global stack := [q0] |
| (07.02) | proc startElement(tag) |
| (07.03) | stack.push(q0) |
| (07.04) | corp |
| (07.05) | proc endElement(tag) |
| (07.06) | q1 := stack.pop( ) |
| (07.07) | q2 := stack.pop( ) |
| (07.08) | q3 := binarysearch(δ,q1,q2) |
| (07.09) | stack.push(q3) |
| (07.10) | corp |

First, a stack structure stack is prepared, and the initial state of the automaton is rendered as q0 (line number 07.01, step 92). The tag σ is read (step 93) to determine whether σ is an open tag or a closed tag (step 94). As described above, the startElement (String tag) method is executed in the case of the open tag. In the startElement ( ) method, the initial state q0 is stacked on the stack (line number 07.03, step 95). Thereafter, it returns to the step 93. The endElement (String tag) method is executed in the case of the closed tag. In the endElement ( ) method, q1 and q2 are sequentially taken out of the head of the stack (line numbers 07.06 to 07.07, step 96), and the table δ is examined by (σ, q1, q2) (line number 07.08, step 97). It is determined whether or not there is a transition in the table δ (step 98), and the validation is a failure if there is no transition (step 99). Moreover, the return value of binarysearch( ) is assumed to be q3 (line number 07.08). Next, q3 is stacked on the stack (line number 07.09, step 100), and it is determined whether the XML document has ended (step 101). If it has not ended (if there is an unread tag), it returns to the step 93. If the XML document has ended, it is determined whether q3 is included in the final state F (step 102). When q3 is included in the final state, the XML document is accepted and is determined as reasonable. On the other hand, if q3 is not included in the final state, the validation is a failure (step 103). The XML document can be validated as described above.

The above procedures will be described in detail below by taking the above described XML document as an example.

i) First, the initial state 0 is stacked on a stack [ ], and an open tag <doc> is read by a stack [0]. A copy of the initial state is stacked on the stack, and the stack becomes [0, 0].

ii) An open tag <title> is read by the stack [0, 0]. The stack becomes [0, 0, 0].

iii) A closed tag </title> is read by the stack [0, 0, 0]. Two of the stack contents are taken out. If δ is examined by a rule of (title, 0, 0), the state consequently transitions to 1. 1 is stacked on the stack, and the stack becomes [1, 0].

iv) An open tag <section> is read by the stack [1, 0]. The stack becomes [0, 1, 0]. Furthermore, the open tag <title> is read. The stack becomes [0, 0, 1, 0].

v) The closed tag </title> is read by the stack [0, 0, 1, 0]. Two of the stack contents are taken out. As it transitions by the rule of (title, 0, 0), the state transitions to 1 and it is stacked on the stack. The stack becomes [1, 1, 0].

vi) An open tag <para> is read by the stack [1, 1, 0]. The stack becomes [0, 1, 1, 0].

vii) A closed tag </para> is read by the stack [0, 1, 1, 0]. Two of the stack contents are taken out. As it transitions by the rule of (para, 1, 0), the state transitions to 2 and it is stacked on the stack. The stack becomes [2, 1, 0].

viii) A closed tag </section> is read by the stack [2, 1, 0]. Two of the stack contents are taken out. As it transitions by the rule of para (1, 2), the state consequently transitions to 3. It is stacked on the stack. The stack becomes [3, 0].

ix) A closed tag </doc> is read by the stack [3, 0]. As it transitions by the rule of doc (0, 3), the state transitions to 4. 4 is the final state, and the document is accepted.

According to the procedures of this embodiment, an amount of calculation is O (n) against a document size n. While this is the same sequence as the past technology, it is implemented by a simpler operation than the past technology. According to this embodiment, the automaton for validating the XML document is represented by the single transition function, so that the program for validating the XML document can be simplified. Thus, it is possible, by rendering the program size smaller, to perform sufficiently practical validation of the XML document even with a small computer (small information processing apparatus) of which hardware resources are scarce. In addition, it is possible to render the stack capacity smaller since the validation can be performed by referring to the single automaton. The merit of implementing the present invention with the small computer is also significant on this point.

Moreover, if the transition function $\delta$ of the minimum deterministic binary tree automaton is represented by a four-term set (array) of ($\sigma$, q1, q2, q3), and if the array $\delta$ is sorted, the procedure binarysearch can efficiently calculate $\delta[\sigma, q1, q2]$ by a binary search. In this case, it is possible to reduce the memory amount to be used although efficiency of calculation is slightly lower than the above described example using the three-dimensional array.

(Embodiment 2)

Figure 10:
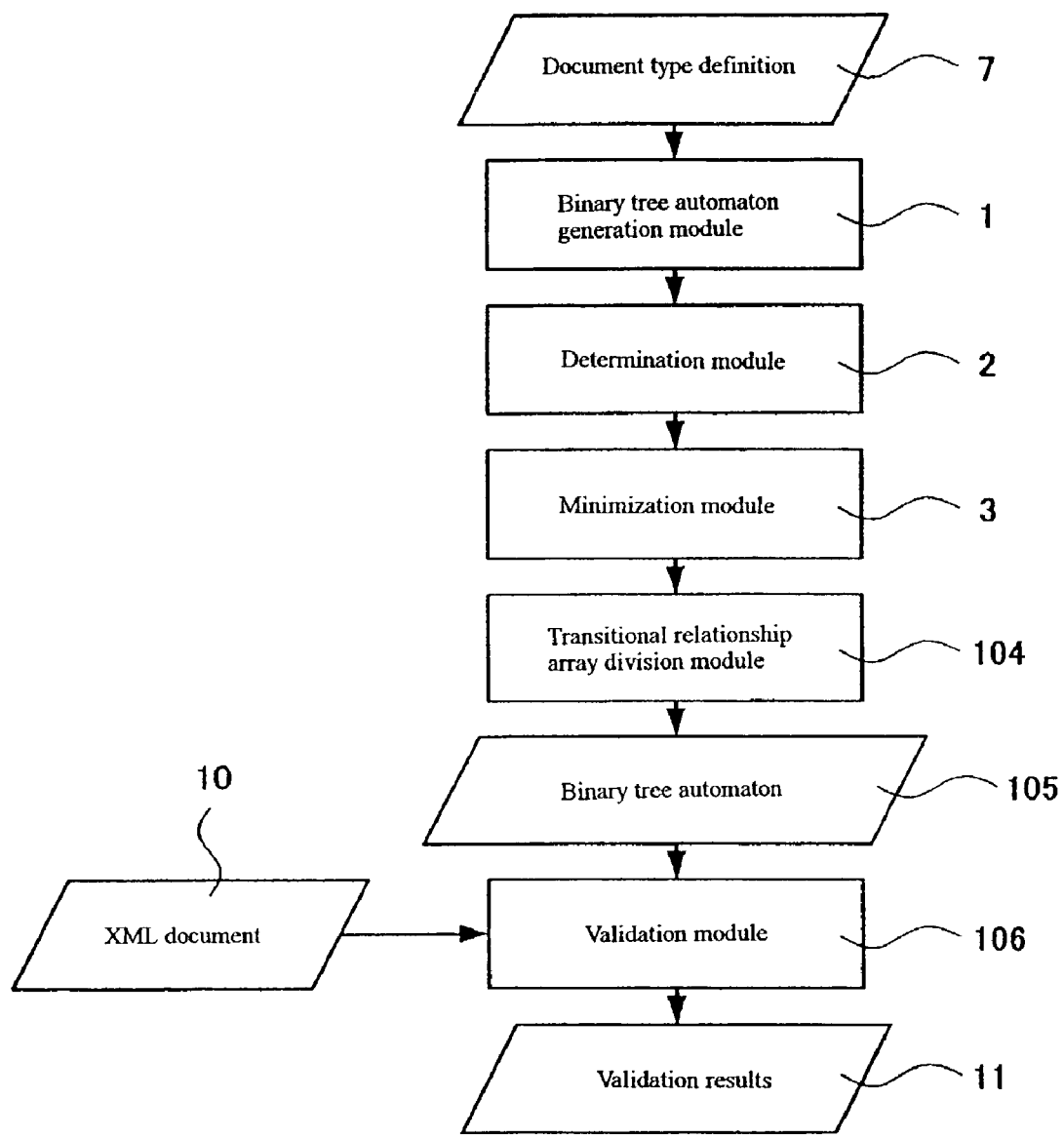
FIG. 10 is a block diagram showing the functions as to an example of the automaton generation system and the validation system as another embodiment of the present invention.

FIG. 10 is a block diagram showing the functions as to an example of the automaton generation system and the validation system as another embodiment of the present invention. Components thereof are the same as the embodiment 1 except a transitional relationship array division module 104 and a validation module 106 shown in FIG. 10. In addition, a binary tree automaton 105 generated by the system for generating automata of this embodiment is also different from the embodiment 1. Hereafter, only the configurations different from the embodiment 1 will be described.

The transitional relationship array division module 104 has the function of dividing the transition function $\delta$ of the binary tree automaton 8 generated by the above described binary tree automaton 1, determination module 2 and minimization module 3. It is possible, by dividing the transition function, to further contract the size thereof. The validation module 106 implements the validation suited to the automaton of which state transitional relationship is represented by such a divided transition function. Hereafter, the method of this embodiment will be described.

Figure 11:
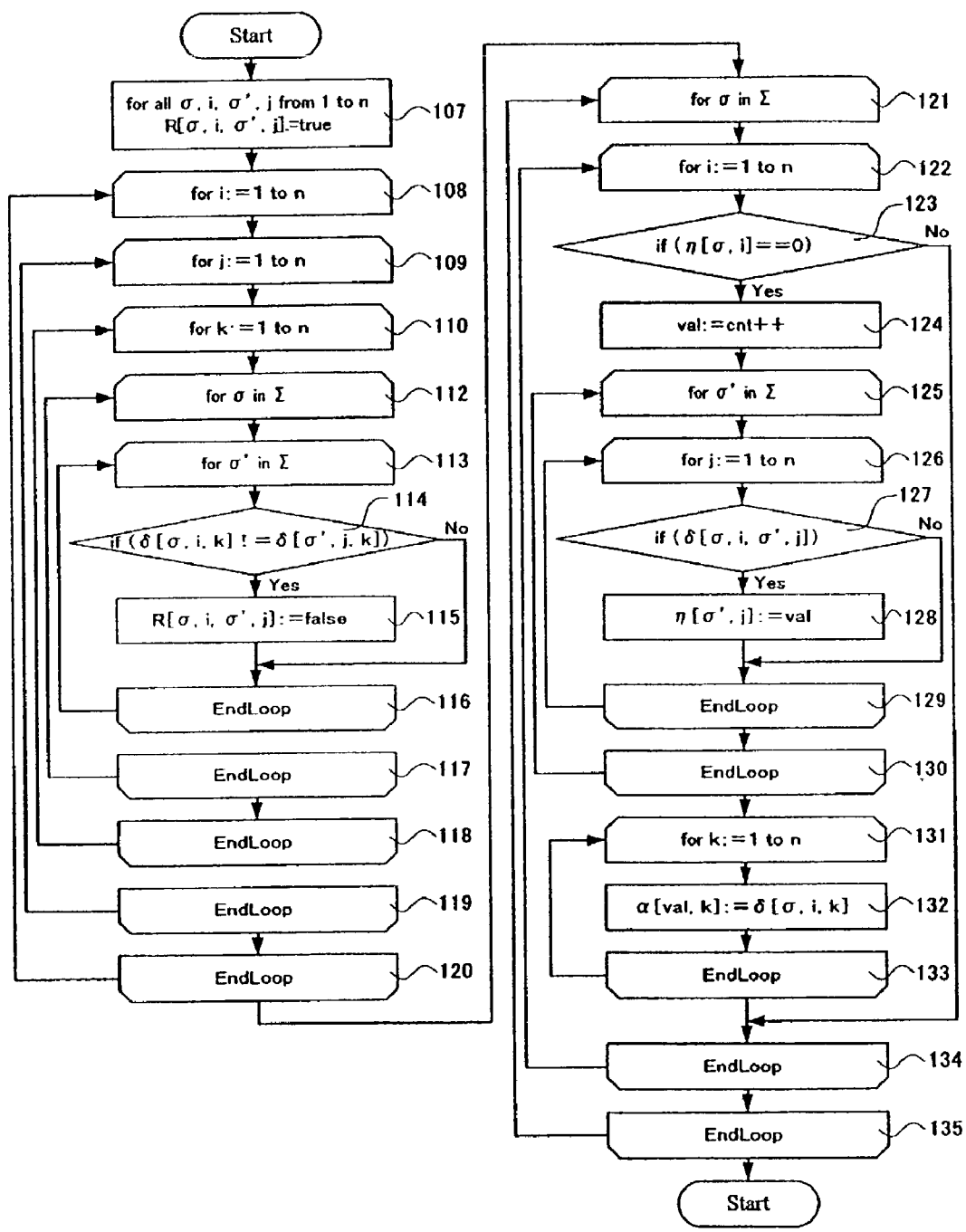
FIG. 11 is a flowchart showing an example of the procedure of the transitional relationship array division of this embodiment.

FIG. 11 is a flowchart showing an example of the procedure of the transitional relationship array division of this embodiment. In addition, a pseudocode 8 shows an example of the program for implementing the division of the transitional relationship array. The following procedure acquires the minimum $\alpha$ and $\eta$ which make $\delta[\sigma, i, j]=\alpha[\eta[\sigma, i], j]$.

| | (Pseudocode 8) |
|---|---|
| (08.01) | for i := 1 to n do |
| (08.02) |   for j := 1 to n do |
| (08.03) |     for k := 1 to n do |
| (08.04) |       for $\sigma$ in $\Sigma$ do |
| (08.05) |         for $\sigma'$ in $\Sigma$ do |
| (08.06) |           if ($\delta[\sigma,i,k]$ != $\delta[\sigma',j,k]$) |
| (08.07) |             $R[\sigma,i,\sigma',j]$ = false |
| (08.08) |         rof |
| (08.09) |       rof |
| (08.10) |     rof |
| (08.11) |   rof |
| (08.12) | rof |
| (08.13) | for $\sigma$ in $\Sigma$ do |
| (08.14) |   for i := 1 to n do |
| (08.15) |     if $\eta[\sigma,i]$ == 0 then |
| (08.16) |       val := cnt++ |
| (08.17) |       for $\sigma'$ in $\Sigma$ do |
| (08.18) |         for j := 1 to n do |
| (08.19) |           if $R[\sigma,i,\sigma',j]$ then $\eta[\sigma',j]$ := val |
| (08.20) |         fi |
| (08.21) |         rof |
| (08.22) |       rof |
| (08.23) |       for k := 1 to n do |
| (08.24) |         $\alpha[val,k]$ := $\delta[\sigma,i,k]$ |
| (08.25) |       rof |
| (08.26) |     fi |
| (08.27) |   rof |
| (08.28) | rof |

As described in the embodiment 1, it is assumed that the generation, determination and minimization of the non-deterministic binary tree automaton are finished, and the minimum deterministic binary tree automaton of which transitional relationship is represented by the single table is sought.

A four-dimensional array $R[\sigma, i, \sigma', j]$ ($\sigma$, $\sigma'$ are the sources of $\Sigma$, and i, j are integers from 1 to n) is created, and all the sources are initialized as true (step 107). This four-dimensional array shows that the pairs ($\sigma$, i) and ($\sigma'$, j) are not distinguishable if seen from $\alpha$, that is, $\eta[\sigma, i]$ and $\eta[\sigma', j]$ can return the same value.

Next, the following operation is repeated for i, j and k of 1 to n, and further for the elements $\sigma$, $\sigma'$ in $\Sigma$ (line numbers 08.01 to 08.12, steps 108 to 120). It is determined whether $\delta[\sigma, i, k]$ and $\delta[\sigma', j, k]$ are a mismatch (line number 08.06, step 114), and if they are a mismatch, $R[\sigma i, \sigma', j]$ is set as false (line number 08.07, step 115). To be more specific, R is set as false for the pairs ($\sigma$, i) and ($\sigma'$, j) which are distinguishable if seen from $\alpha$.

Next, a unique value is established to the set of ($\sigma$, i) to which the same value may be returned, and it is set as the value of $\eta[\sigma, i]$. In addition, the value of $\eta[\sigma, i]$ is used to establish $\alpha$ so as to imitate the result of the original $\delta$ (line numbers 08.13 to 08.28, steps 121 to 135). Moreover, it is assumed that every $\eta[\sigma, i]$ is initialized by 0, and a counter variable cnt is initialized by 0.

The following operation is repeated for $\sigma$ in $\Sigma$ and further for i of 1 to n (line numbers 08.13 to 08.23, steps 121 to 135). It is determined whether $\eta[\sigma, i]$ is 0 (line number 08.15, step 123), and if it is 0, it will be the representative source. cnt is substituted into a variable val (line number 08.16, step 124). Moreover, val is a value showing a new state, and it becomes the return value of η. Moreover, cnt increases by 1. Furthermore, the following operation is repeated for σ' in Σ and further for j of 1 to n (line numbers 08.17 to 08.22, steps 125 to 130). It is determined whether R[σ, i, σ', j] is true (steps 127), and val is substituted into η[σ', j] if it is true (step 128, line number 08.19). To be more specific, η always returns the same value val to (σ', j) which is not distinguished from (σ, i). Next, for k of 1 to n, δ[σ, i, k] is substituted into α[val, k]. To be more specific, the transition of a by val is set.

New tables α and η are outputted by such an operation. To be more specific, the binary tree automaton 105 generated by this embodiment is represented by a set of six terms of <Σ, Q, α, η, I, F>. Such an automaton allows the size to be smaller than the case of the embodiment 1 wherein the arrays α and η representing the transitional relationship are represented by the single array (table).

The automaton generated by the procedure of this embodiment is shown below by taking the above described sample DTD as an example. To be more specific, it is Σ={doc, title, section, para}, Q={0, 1, 2, 3, 4}, I={0}, F={4}, and η is as shown in Table 5 and α is as shown in Table 6. Moreover, α shows the transitional relationship of Q×R->Q, and η shows the transitional relationship of Σ×Q->R. It is assumed to be R={i, ii, iii, iv}

TABLE 5

|  | doc | title | section | para |
|---|---|---|---|---|
| $0^I$ | — | ii | — | iv |
| 1 | — | — | — | — |
| 2 | — | — | iii | — |
| 3 | i | — | iii | — |
| $4^F$ | — | — | — | — |

TABLE 6

|  | i | ii | iii | iv |
|---|---|---|---|---|
| $0^I$ | 4 | 1 | — | — |
| 1 | — | — | 3 | 2 |
| 2 | — | — | — | — |
| 3 | — | — | 3 | — |
| $4^F$ | — | — | — | — |

Moreover, while the number of transitions, that is, the size of a domain of the table |α|+|η| is increased compared to the case of the embodiment 1, it will be rendered less than this embodiment for a larger automaton.

Figure 12:
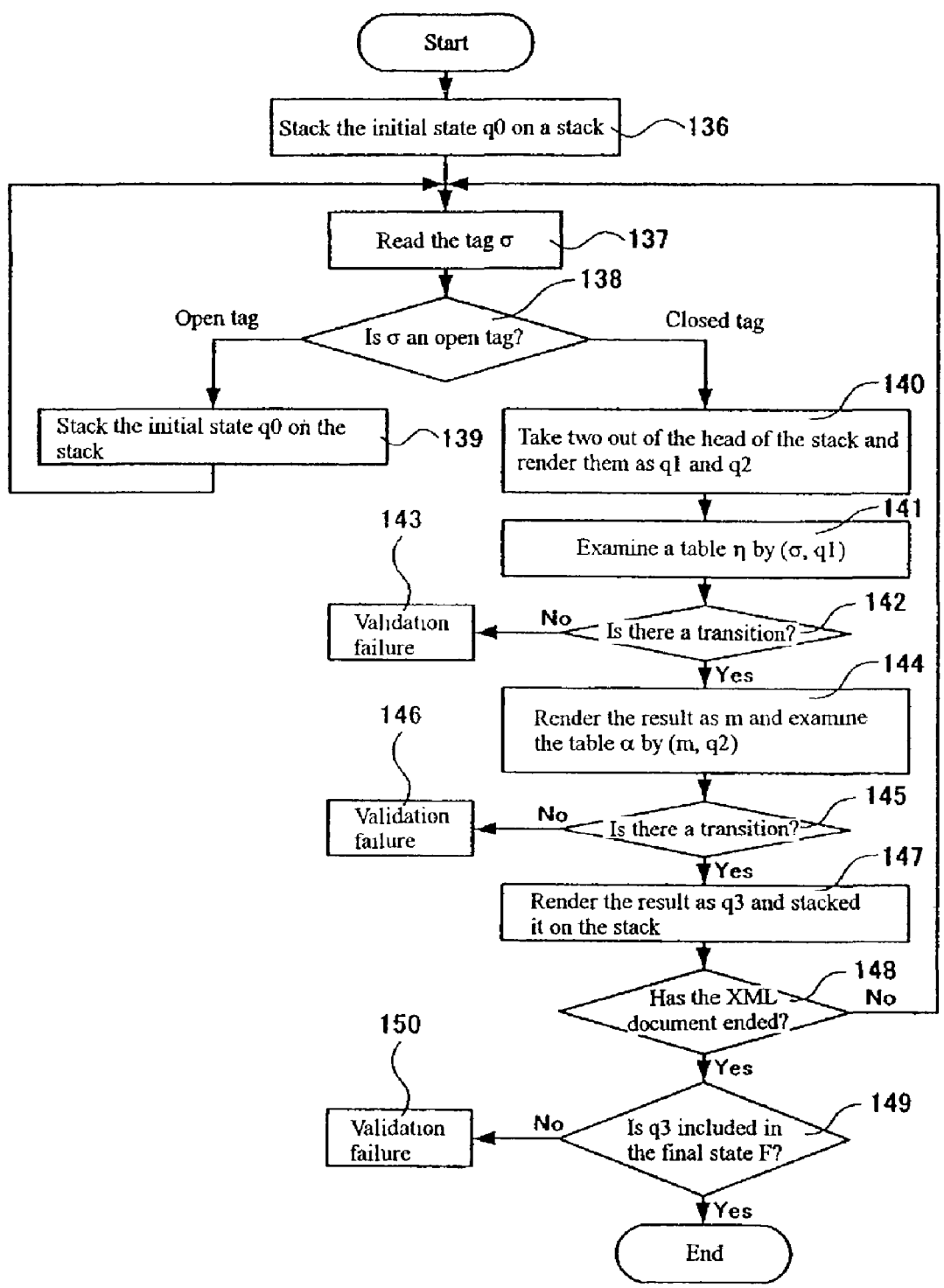
FIG. 12 is a flowchart showing an example of the procedure of the validation of this embodiment.
Figure 13:
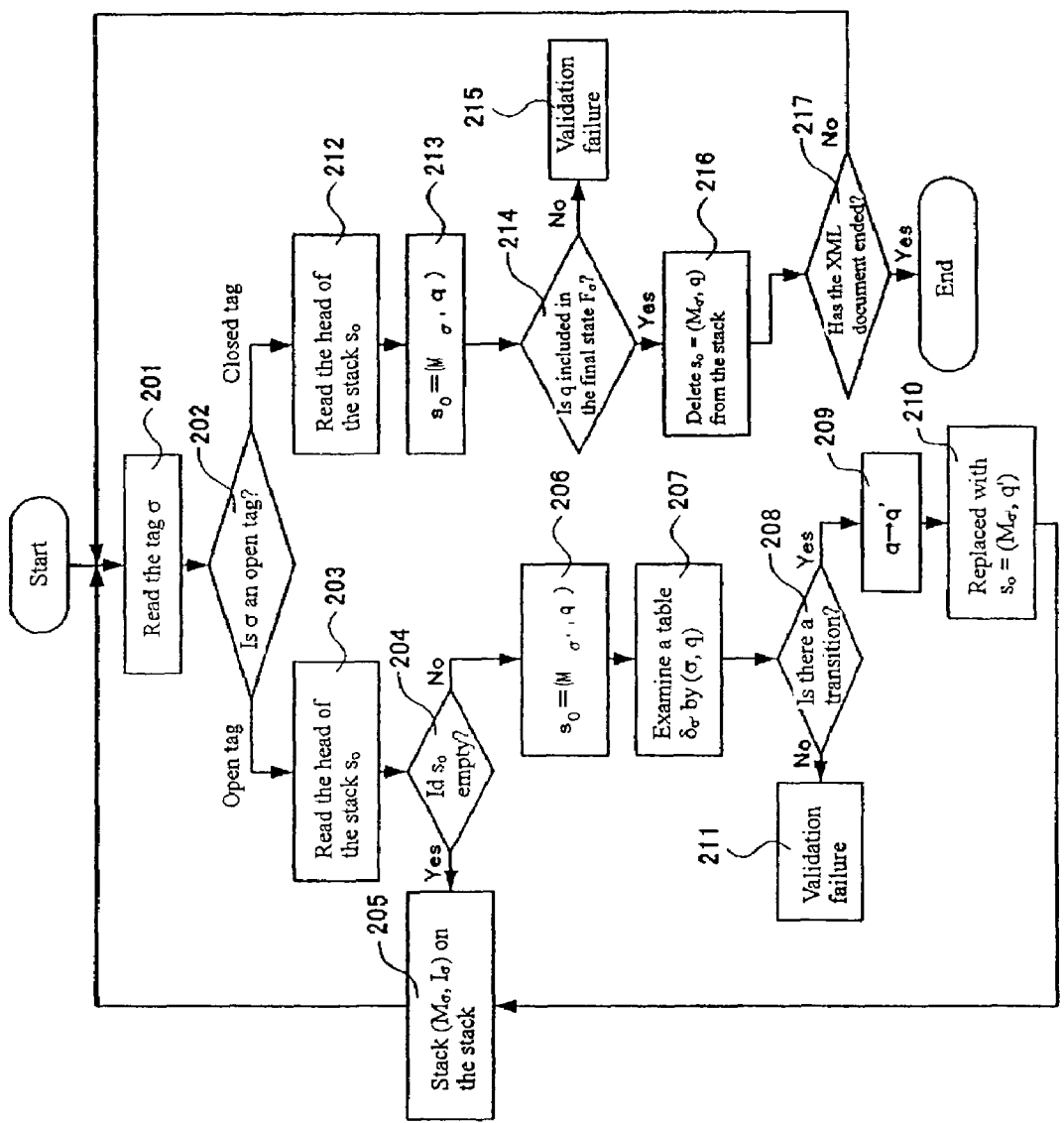
FIG. 13 is a flowchart showing the procedure of the validation in the past.

Next, the procedure of the validation of this embodiment will be described. FIG. 12 is a flowchart showing an example of the procedure of the validation of this embodiment. The steps 136 to 140 are the same as the steps 92 to 96 in FIG. 9 of the embodiment 1.

The table η is examined by (σ, q1) by using q1 and q2 taken out in the step 140 (step 141). It is determined whether or not there is a transition in the table η (step 142), and the validation is a failure if there is no transition (step 143). If there is the transition, the results are rendered as m, and the table α is examined by (m, q2) (step 144). It is determined whether or not there is the transition in the table α (step 145), and the validation is a failure if there is no transition (step 146). If there is the transition, the results are rendered as q3, and q3 is stacked on the stack (step 147), and it is determined whether or not the XML document has ended (step 148). If it has not ended (if there is an unread tag), it returns to the step 137. If the XML document has ended, it is determined whether q3 is included in the final state F (step 149).

When the state q3 is included in the final state, the XML document is accepted and is determined as reasonable. On the other hand, if the state q3 is not included in the final state, the validation is a failure (step 150). The XML document can be validated by using the automaton of a smaller table (array) size as described above.

Moreover, it is also possible to combine a binary search method with the above described method. In this case, the memory amount to be used can be further significantly reduced.

According to this embodiment, the transition function (a table or an array) of the automaton for validating the XML document is rendered smaller, and so the capacity of the required memory can be small. To be more specific, the present invention can exert its effects remarkably on the small information processing apparatus of which hardware resources are scarce.

In addition, according to a review by the inventors hereof, it has the effects that the program size of the validator of this embodiment 2 is contracted to approximately 86 percent of that of the corresponding portion of the validator in the past, the size of the automaton in the α–η form of this embodiment is contracted to approximately 70 percent of that of the automaton in the past, and the time for the validation is reduced to approximately 43 percent thereof.

While the invention implemented by the inventors hereof was described above based on the embodiments, the present invention is not limited to the above described embodiments and is capable of various changes within the range not to deviate from the outline thereof.

For instance, it is possible to add a lookahead operation to the operation of the binary tree automaton. To be more specific, 0 of the initial state was always stacked on the stack, irrespective of what was read as the open tag in the validating operation in the above described embodiments. It is changed to the operation wherein the initial state is distinguished depending on what was read as the open tag. This change allows the table to be further contracted without altering the efficiency of the validation.

In addition, while the example of dividing the table into two after determining and minimizing the non-deterministic binary tree automaton was described in the above described embodiment 2, the determination and minimization are not essential. The effects of the present invention can also be expected by dividing a transition table of the non-deterministic binary tree automaton into two as in the embodiment 2.

Advantages of the Invention

Of the inventions disclosed herewith, the effects obtained by the representative ones are as follows. To be more specific, it is possible to simplify the processing for the validation of the XML document and improve the processing speed. In addition, it is possible to provide the means for generating the transitional relationship table capable of simplifying the validation. Furthermore, it is feasible to render the size of the program required for the validation smaller and reduce the necessary memory size.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A method comprising employing a computer for generating an automaton for validating an XML document, the step of employing comprising:
    a first step of reading a document type definition of the XML Document;
    a second step of generating a binary tree automaton from said document type definition; and
    a third step of determining and further minimizing said binary tree automaton, and generating a minimum deterministic binary tree automaton, wherein said binary tree automaton is represented by a tuple of five components of an alphabet $\Sigma$ whose element is each tag name $\sigma$ of said document type definition, a state set Q whose element is each state q, and the transition function $\delta$ which maps a triple of said $\sigma$, child element state qc and sibling element of said $\sigma$, child element state qc and sibling element state qb to a transition state, an initial state set I and a set of final states F, and
    grammar G of said document type definition is represented by a sequence of grammar declarations of a regular expression t to be constructed of a selection, a sequence, a repetition, an element, a terminal symbol, and a nonterminal symbol specified by predefined metacharacters and a nonterminal symbol X corresponding to said regular expression t, and
said second step includes:
    a step of receiving said grammar G and a start symbol Xs as arguments;
    an initialization step of making Q={Xs}, $\delta$={ }, I={ }, F={Xs}; and
    as to said t corresponding to the symbol X in said state set Q,
    a step of executing a recursive call function compute (t) of which argument is said t and rendering a return value thereof as $\Delta$;
    a step of, if said $\Delta$ includes a terminal symbol $\epsilon$, adding a state corresponding to said t to said I; and
    a step of, as to said $\sigma$ in said $\Delta$ excluding said $\epsilon$, adding to said $\delta$ the symbol X corresponding to said t as the element of the set of said $\sigma$, said qc and said qb, and
said recursive call function compute (t) returns:
    if said t is said $\epsilon$, a set {$\epsilon$} based on said $\epsilon$;
    if said t is the sequence of selection of a first regular expression t1, a second regular expression t2 and a third regular expression t3, a sum set of a result set of said compute (t) of which argument is the sequence of said t1 and t2 and the result set of said compute (t) of which argument is the sequence of said t1 and said t3;
    if said t is the sequence of said t1 with the sequence of said t2 and said t3, the result set of said compute (t) of which argument is the sequence of said t1 and said t2 with the sequence of said t3;
    if said t is the sequence of the repetitions of said t1 and said t2, the sum set of the result set of said compute (t) of which argument is the sequence of the repetitions of said t1 and said t2 and the sequence of said t2 and the result set of said compute (t) of which argument is said t1;
    if said t is the sequence of said t1 and said $\epsilon$, the result set of said compute (t) of which argument is said t1, and adds to said Q the symbol X corresponding to said t1 and said t if said t is the sequence of said t1 and said $\sigma$, and associates with said $\sigma$ said t1 as said qc and said symbol X as said qb, and returns said $\sigma$, and
    returns the result set of said compute (t) of which argument is the sequence of said $\epsilon$ and said t if said t is other than the above.

2. The method according to claim 1, further including a fourth step of dividing a transition function $\delta$ of said minimum deterministic binary tree automaton into minimum arrays $\alpha$ and $\eta$ which make $\delta[\sigma, i, j]=\alpha[\eta[\sigma, i], j]$, said fourth step including the steps of:
    determining whether each of states represented by combinations of said arrays $\alpha$ and $\eta$ is the state identifiable with another state; and
    setting a new status value to said identifiable state and determining by using said new status value the arrays $\alpha$ and $\eta$ which make $\delta[\sigma, i, j]=\alpha[\eta[\sigma, i], j]$.

3. An article of manufacture comprising a computer usable medium having computer readable program code means embodied therein for causing generation of an automaton for validating an XML document, the computer readable program code means in said article of manufacture comprising computer readable program code means for causing a computer to effect the steps of claim 1.

4. A program storage device readable by machine, tangibly embodying a program of instructions executable by the machine to perform method steps for generating an automaton for validating an XML document, said method steps comprising the steps of claim 1.

5. A method comprising employing a computer for generating an automaton for validating an XML document, the step of employing comprising:
  a first step of reading a document type definition of the XML Document;
  a second step of generating a binary tree automaton from said document type definition; and
  a third step of dividing a transition function δ of said binary tree automaton into minimum arrays α and η which make δ[σ, i, j]=α[η[σ, i], j], said fourth step including the steps of;
  determining whether each of states represented by combinations of said arrays α and η is the state identifiable with another state; and
  setting a new status value to said identifiable state and determining by using said new status value the arrays α and η which make δ[σ, i, j]=α[η, [σ, i], j].

6. An article of manufacture comprising a computer usable medium having computer readable program code means embodied therein for causing generation of an automaton for validating an XML document, the computer readable program code means in said article of manufacture comprising computer readable program code means for causing a computer to effect the steps of claim 5.

7. A method comprising employing a computer for generating an automaton for validating an XML document, the step of employing comprising:
  a first step of reading a document type definition of the XML Document;
  a second step of generating a binary tree automaton from said document type definition; and
  a third step of determining and further minimizing said binary tree automaton, and generating a minimum deterministic binary tree automaton, wherein said binary tree automaton is represented by an alphabet Σ based on each tag name σ of said document type definition, a state set Q, a transition function δ, an initial state set I and a set of final states F, and
  said deterministic binary tree automaton is represented by the alphabet Σ, a state set Q', a transition function δ', an initial state q0 and a set of final states F', and
  determination in said third step includes:
  an initialization step of making q0=I, Q'={I};
  a step of totaling, as to an arbitrary element pair S1 and S2 in said Q', all the states reachable from the states belonging to said S1 and S2 about a tag name σ;
  a step of, if an interaction between the set obtained by said total and the set of final states F of a non-deterministic binary tree automaton is not empty, adding the set obtained by said total to the set of final states F';
  a step of adding the set obtained by said total to said state set Q';
  a step of rendering the elements of the transition function δ' on said σ, S1 and S2 as said all the reachable states; and
  a step of repeating said steps as to all of said σ and all the arbitrary element pairs S1 and S2 in Q', and
  the minimizing in said third step includes the steps of:

determining the identifiable state of the states of said deterministic binary tree automaton;
  calculating a representative source in said identifiable state; and
  obtaining the new transition function δ' from said representative source.

8. A method comprising employing a computer for validating an XML document by using an automaton represented by an alphabet Σ based on each tag name σ of a document type definition thereof, a state set Q based on a state q, and the transition function δ represented by a single three-dimensional array of which element is a transition state comprised of three indexes of said σ, child element row information qc and sibling element row information qb of said σ, an initial state set I and a set of final states F, the method further comprising:
  a step of inputting said automaton;
  a step of inputting the XML document which is a subject of validating whether it suits said document type definition;
  a step of generating a stack and pushing an initial state q0 to said stack included in said initial state set I;
  a seventh step of reading a tag σ of said XML document;
  an eighth step of determining whether said tag σ is an open tag;
  a step of, if it is determined to be an open tag in said eighth step, stacking said initial state q0 on said stack and returning to said seventh step thereafter;
  a step of, if it is determined to be a closed tag in said eighth step, taking two out of the head of said stack and rendering them as q1 and q2;
  a ninth step of examining said transition function δ by (σ, q1, q2) and determining whether there is a transition;
  a step of, if it is determined that there is the transition in said ninth step, rendering the transition state as q3 and stacking said q3 on said stack;
  a tenth step of determining whether all the tags of said XML document were read;
  a step of, if it is determined that there is an unread tag in said tenth step, returning to said seventh step;
  an eleventh step of, if it is determined that all the tags were read in said tenth step, determining whether the state recorded at the head of the stack is included in said set of final states F; and
  a step of, if the determination in said eleventh step is true, accenting said XML document as reasonable.

9. A method comprising employing a computer for validating an XML document by using an automaton represented by an alphabet Σ based on each tag name σ of a document type definition thereof, a state set Q based on a state q, arrays α and η showing a transitional relationship of the states, an initial state set I and a set of final states F, and wherein said arrays α and η are comprised of three indexes of said σ, child element row information qc and sibling element row information qb of said σ, and a single three-dimensional array of which element is a transition state is divided into minimum arrays α and η which make δ[σ, i, j]=α[η[σ, i], j], the step of employing comprising:
  a step of inputting said automaton;
  a step of inputting the XML document which is a subject of validating whether it suits said document type definition;
  a step of generating a stack and pushing an initial state q0 to said stack included in said initial state set I;
  a twelfth step of reading a tag σ of said XML document;
  a thirteenth step of determining whether said tag σ is an open tag;

a step of, if it is determined to be an open tag in said thirteenth step, stacking said initial state q0 on said stack and returning to said twelfth step thereafter;

a step of, if it is determined to be a closed tag in said thirteenth step, taking two out of the head of said stack and rendering them as q1 and q2;

a fourteenth step of examining said array t1 by (σ, σ1) and determining whether there is a transition;

a fifteenth step of, if it is determined that there is the transition in said fourteenth step, rendering the results as m, examining the array α by (m, q2) and determining whether there is the transition;

a step of, if it is determined that there is the transition in said fifteenth step, rendering the results as q3 and stacking said q3 on said stack;

a sixteenth step of determining whether all the tags of said XML document were read;

a step of, if it is determined that there is an unread tag in said sixteenth step, returning to said twelfth step;

a seventeenth step of, if it is determined that all the tags were read in said sixteenth step, determining whether the state recorded at the head of the stack is included in said set of final states F; and a step of, if the determination in said seventeenth step is true, accepting said XML document as reasonable.

10. A program storage device readable by machine, tangibly embodying a program of instructions executable by the machine to perform method steps for generating an automaton for validating an XML document, said method steps comprising the steps of claim 9.

11. A system for comprising a computer for generating an automaton for validating an XML document, the system further comprising:

first means for reading a document type definition of the XML Document;

second means for generating a binary tree automaton from said document type definition;

third means for determining and further minimizing said binary tree automaton, and generating a minimum deterministic binary tree automaton, and wherein said binary tree automaton is represented by an alphabet Σ based on each tag name σ of said document type definition, a state set Q, a transition function δ, an initial state set I and a set of final states F, and said deterministic binary tree automaton is represented by the alphabet Σ, a state set Q', a transition function δ', an initial state q0 and a set of final states F', and determination in said third means includes;

an initialization means for making q0=I, Q'={I};

means for totaling, as to an arbitrary element pair S1 and S2 in said Q', all the states reachable from the states belonging to said S1 and S2 about the tag name σ;

means for, if an interaction between the set obtained by said total and the set of final states F of a non-deterministic binary tree automaton is not empty, adding the set obtained by said total to the set of final states F';

means for adding the set obtained by said total to said state set Q';

means for rendering the elements of the transition function δ' on said σ, S1 and S2 as said all the reachable states; and means for repeating said means as to all of said σ and all the arbitrary element pairs S1 and S2 in Q', and the minimization in said third means includes the means for:

determining the identifiable state of the states of said deterministic binary tree automaton;

calculating a representative source in said identifiable state; and obtaining the new transition function δ' from said representative source.

12. The system according to claim 11, further including fourth means for dividing a transition function δ of said minimum deterministic binary tree automaton into minimum arrays α and η which make δ[σ, i, j]=α[η[σ, i], j], said fourth means including the means of:

determining whether each of states represented by combinations of said arrays α and η is the state identifiable with another state; and setting a new status value to said identifiable state and determining by using said new status value the arrays α and η which make δ[σ, i, j]=α[η[σ, i], j].

13. The system according to claim 11, wherein said binary tree automaton is represented by a tuple of five components of an alphabet Σ whose element is each tag name σ of said document type definition, a state set Q whose element is each state q, and the transition function δ which maps a triple of said σ, child element state qc and sibling element of said σ, child element state qc and sibling element state qb to a transition state, an initial state set I and a set of final states F, and grammar G of said document type definition is represented by a sequence of grammar declarations of a regular expression t to be constructed of a selection, a sequence, a repetition, an element, a terminal symbol, and a nonterminal symbol specified by predefined metacharacters and a nonterminal symbol X corresponding to said regular expression t, and said second means includes:

means for receiving said grammer G and a start symbol Xs as arguments;

initialization means for making Q={Xs}, δ={ }, I={ }, F={Xs}; and as to said t corresponding to the symbol X in said state set Q, means for executing a recursive call function compute (t) of which argument is said t and rendering a return value thereof as Δ;

means for, if said Δ includes a terminal symbol ε, adding a state corresponding to said t to said I; and means for, as to said σ in said Δ excluding said ε, adding to said δ the symbol X corresponding to said t as the element of the set of said σ, said qc and said qb, and said recursive call function compute (t) returns:

if said t is said ε, a set {ε} based on said ε;

if said t is the sequence of selection of a first regular expression t1, a second regular expression t2 and a third regular expression t3, a sum set of a result set of said compute (t) of which argument is the sequence of said t1 and t2 and the result set of said compute (t) of which argument is the sequence of said t1 and said t3;

if said t is the sequence of said t1 with the sequence of said t2 and said t3, the result set of said compute (t) of which argument is the sequence of said t1 and said t2 with the sequence of said t3;

if said t is the sequence of the repetitions of said t1 and said t2, the sum set of the result set of said compute (t) of which argument is the sequence of the repetitions of said t1 and said t2 and the sequence of said t2 and the result set of said compute (t) of which argument is said t1;

if said t is the sequence of said t1 and said ε, the result set of said compute (t) of which argument is said t1, and adds to said Q the symbol X corresponding to said t1 and said t if said t is the sequence of said t1 and said σ, and associates with said σ said t1 as said qc and said symbol X as said qb, and returns said σ, and returns the result set of said compute (t) of which argument is the sequence of said ε and said t if said t is other than the above.

14. A computer program product comprising a computer usable medium having computer readable program code means embodied therein for causing generation an automaton for validating an XML document, the computer readable program code means in said computer program product comprising computer readable program code means for causing a computer to effect the functions of claim 11.

15. A system for generating an automaton for validating an XML document, comprising a computer comprising:
first means for reading a document type definition of the XML Document;
second means for generating a binary tree automaton from said document type definition; and
third means for dividing a transition function δ of said binary tree automaton into minimum arrays α and η which make δ[σ, i, j]=α[η[σ, i], j], said third means including the means for:
determining whether each of states represented by combinations of said arrays α and η is the state identifiable with another state; and
setting a new status value to said identifiable state and determining by using said new status value the arrays α and η which make δ[σ, i, j]=α[η[σ, i], j].

16. A computer program product comprising a computer usable medium having computer readable program code means embodied therein for causing generation an automaton for validating an XML document, the computer readable program code means in said computer program product comprising computer readable program code means for causing a computer to effect the functions of claim 15.

17. A system for validating an XML document, comprising means for using an automaton represented by an alphabet Σ whose element is each tag name σ of a document type definition thereof, a state set Q whose element is each state q, and the transition function δ represented by a single three-dimensional array which maps triple of said σ, child element state qc and sibling element state qb to a transition state, an initial state set I and a set of final states F, the system comprising a commuter comprising:
means for inputting said automaton;
means for inputting the XML document which is a subject of validating whether it suits said document type definition;
means for generating a stack and pushing an initial state q0 to said stack included in the initial state set I;
seventh means for reading a tag σ of said XML document;
eighth means for determining whether said tag σ is an open tag;
means for, if it is determined to be an open tag by said eighth means, stacking said initial state q0 on said stack and returning to said seventh means thereafter;
means for, if it is determined to be a closed tag by said eighth means, taking two out of the head of said stack and rendering them as q1 and q2;
ninth means for examining said transition function δ by (σ, q1, q2) and determining whether there is a transition;
means for, if it is determined that there is the transition by said ninth means, rendering the transition state as q3 and stacking said q3 on said stack;

tenth means for determining whether all the tags of said XML document were read;
means for, if it is determined that there is an unread tag by said tenth means, returning to said seventh means;
eleventh means for, if it is determined that all the tags were read by said tenth means, determining whether the state recorded at the head of the stack is included in said set of final states F; and
means for, if the determination in said eleventh step is true, accepting said XML document as reasonable.

18. A system comprising a computer comprising means for validating an XML document by using an automaton represented by an alphabet Σ based on each tag name σ of a document type definition thereof, a state set Q based on a state q, arrays α and η showing a transitional relationship of the states, an initial state set I and a set of final states F, and wherein said arrays α and η are comprised of three indexes of said σ, child element row information qc and sibling element row information qb of said σ, and a single three-dimensional array of which element is a transition state is divided into minimum arrays α and η which make δ[σ, i, j]=α[η[σ, i], j], including:
means for inputting said automaton;
means for inputting the XML document which is a subject of validating whether it suits said document type definition;
means for generating a stack and pushing an initial state q0 to said stack included in said initial state set I;
twelfth means for reading a tag a of said XML document;
thirteenth means for determining whether said tag σ is an open tag;
means for, if it is determined to be an open tag by said thirteenth means, stacking said initial state q0 on said stack and returning to said twelfth means thereafter;
means for, if it is determined to be a closed tag by said thirteenth means, taking two out of the head of said stack and rendering them as q1 and q2;
fourteenth means for examining said array η by (α, q1) and determining whether there is a transition;
fifteenth means for, if it is determined that there is the transition by said fourteenth means, rendering the results as m, examining the array α by (m, q2) and determining whether there is the transition;
means for, if it is determined that there is the transition by said fifteenth means, rendering the results as q3 and stacking said q3 on said stack;
sixteenth means for determining whether all the tags of said XML document were read;
means for, if it is determined that there is an unread tag by said sixteenth means, returning to said twelfth means;
seventeenth means for, if it is determined that all the tags were read by said sixteenth means, determining whether the state recorded at the head of the stack is included in said set of final states F; and
means for, if the determination in said seventeenth means is true, accepting sad XML document as reasonable.

19. A tangible program product for a computer, said product comprising means for having a computer execute:
a first procedure for reading a document type definition of an XML Document;
a second procedure for generating a binary tree automaton from said document type definition;
a third procedure for determining and further minimizing said binary tree automaton, and generating a minimum deterministic binary tree automaton,
and further comprising means for the computer to execute a fourth procedure for dividing a transition function δ of said minimum deterministic binary tree automaton into minimum arrays $\alpha$ and $\eta$ which make $\delta[\sigma, i, j]=\alpha[\eta[\sigma, i], j]$, said fourth procedure including the means for:

determining whether each of states represented by combinations of said arrays $\alpha$ and $\eta$ is the state identifiable with another state; and setting a new status value to said identifiable state and determining by using said new status value the arrays $\alpha$ and $\eta$ which make $\delta[\sigma, i, j]=\alpha[\eta[\sigma, i], j]$.

20. A tangible program product for use in a computer including means comprising:

a first procedure for reading a document type definition of an XML Document;

a second procedure for generating a binary tree automaton from said document type definition; and a fourth procedure for dividing a transition function $\delta$ of said binary tree automaton into minimum arrays $\alpha$ and $\eta$ which make $\delta[\sigma, i, j]=\alpha[\eta[\sigma, i], j]$, said fourth procedure including the procedures for:

determining whether each of states represented by combinations of said arrays $\alpha$ and $\eta$ is the state identifiable with another state; and setting a new status value to said identifiable state and determining by using said new status value the arrays $\alpha$ and $\eta$ which make $\delta[\sigma, i, j]=\alpha[\eta[\sigma, i], j]$.

21. A program product for having a computer execute:

a procedure for inputting an automaton represented by an alphabet $\Sigma$ based on each tag name $\sigma$ of a document type definition of an XML Document, a state set Q based on a state q, and a transition function $\delta$ represented by a single three-dimensional array of which element is a transition state comprised of three indexes of said $\sigma$, child element row information qc and sibling element row information qb of said $\sigma$, an initial state set I and a set of final states F;

a procedure for inputting the XML document which is a subject of validating whether it suits said document type definition;

means for generating a stack and pushing an initial state q0 to said stack included in the initial state set I;

a seventh procedure for reading a tag $\sigma$ of said XML document;

an eighth procedure for determining whether said tag $\sigma$ is an open tag;

a procedure for, if it is determined to be an open tag by said eighth procedure, stacking said initial state q0 on said stack and returning to said seventh procedure thereafter;

a procedure for, if it is determined to be a closed tag by said eighth procedure, taking two out of the head of said stack and rendering them as q1 and q2;

a ninth procedure for examining said transition function $\delta$ by ($\sigma$, q1, q2) and determining whether there is a transition;

a procedure for, if it is determined that there is the transition by said ninth procedure, rendering the transition state as q3 and stacking said q3 on said stack;

a tenth procedure for determining whether all the tags of said XML document were read;

a procedure for, if it is determined that there is an unread tag by said tenth procedure, returning to said seventh procedure;

an eleventh procedure for, if it is determined that all the tags were read by said tenth procedure, determining whether the state recorded at the head of the stack is included in said set of final states F; and a procedure for, if the determination in said eleventh procedure is true, accepting said XML document as reasonable.

22. A program product for having a computer execute:

a procedure for inputting an automaton represented by an alphabet $\Sigma$ based on each tag name $\sigma$ of a document type definition of an XML document, a state set Q based on a state q, arrays $\alpha$ and $\eta$ showing a transitional relationship of the states, an initial state set I and a set of final states F, and wherein said arrays $\alpha$ and $\eta$ are comprised of three indexes of said $\sigma$, child element row information qc and sibling element row information qb of said $\sigma$, and a single three-dimensional array of which element is a transition state is divided into minimum arrays $\alpha$ and $\eta$ which make $\delta[\sigma, i, j]=\alpha[\eta[\sigma, i], j]$;

a procedure for inputting the XML document which is a subject of validating whether it suits said document type definition;

a procedure for generating a stack and pushing an initial state q0 to said stack included in said initial state set I;

a twelfth procedure for reading a tag $\sigma$ of said XML document;

a thirteenth procedure for determining whether said tag $\sigma$ is an open tag;

a procedure for, if it is determined to be an open tag by said thirteenth procedure, stacking said initial state q0 on said stack and returning to said twelfth procedure thereafter;

a procedure for, if it is determined to be a closed tag by said thirteenth procedure, taking two out of the head of said stack and rendering them as q1 and q2;

a fourteenth procedure for examining said array $\eta$ by ($\sigma$, q1) and determining whether there is a transition;

a fifteenth procedure for, if it is determined that there is the transition by said fourteenth procedure, rendering the results as m, examining the array $\alpha$ by (m, q2) and determining whether there is the transition;

a procedure for, if it is determined that there is the transition by said fifteenth procedure, rendering the results as q3 and stacking said q3 on said stack;

a sixteenth procedure for determining whether all the tags of said XML document were read;

a procedure for, if it is determined that there is an unread tag by said sixteenth procedure, returning to said twelfth procedure;

a seventeenth procedure for, if it is determined that all the tags were read by said sixteenth procedure, determining whether the state recorded at the head of the stack is included in said set of final states F; and a procedure for, if the determination in said seventeenth procedure is true, accepting said XML document as reasonable.

* * * * *